United States Patent
Thomas et al.

(10) Patent No.: US 10,886,775 B2
(45) Date of Patent: Jan. 5, 2021

(54) ACTIVE MULTI-MODULE SWITCHING SYSTEM AND METHOD

(71) Applicant: Toshiba International Corporation, Houston, TX (US)

(72) Inventors: Joseph Bowman Thomas, Houston, TX (US); Jesus Penalver-Gamboa, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 224 days.

(21) Appl. No.: 15/980,210

(22) Filed: May 15, 2018

(65) Prior Publication Data

US 2018/0337554 A1 Nov. 22, 2018

Related U.S. Application Data

(60) Provisional application No. 62/507,594, filed on May 17, 2017.

(51) Int. Cl.
*H02J 9/06* (2006.01)
*H02J 3/38* (2006.01)
*H02J 3/46* (2006.01)

(52) U.S. Cl.
CPC .............. *H02J 9/061* (2013.01); *H02J 3/381* (2013.01); *H02J 3/46* (2013.01); *H02J 9/062* (2013.01)

(58) Field of Classification Search
CPC .... H02J 9/061; H02J 3/46; H02J 9/062; H02J 3/381
See application file for complete search history.

(56) References Cited

U.S. PATENT DOCUMENTS

| | | | |
|---|---|---|---|
| 6,433,444 B1 * | 8/2002 | de Vries | H02J 1/10 307/64 |
| 2013/0069432 A1 * | 3/2013 | Beg | H02J 9/061 307/64 |
| 2013/0069434 A1 * | 3/2013 | Beg | H02J 9/062 307/66 |
| 2016/0181861 A1 * | 6/2016 | Familiant | H02M 7/42 307/66 |
| 2016/0294214 A1 * | 10/2016 | Mosman | H02J 7/34 |

OTHER PUBLICATIONS

McCarthy et al.: "Comparing UPS System Design Configurations" Schneider Electric—Data Center Science Center, White Paper 75 Rev 4, 2016 (27 pages).

* cited by examiner

*Primary Examiner* — Jared Fureman
*Assistant Examiner* — Emmanuel Dominique
(74) *Attorney, Agent, or Firm* — Baker Botts L.L.P.

(57) ABSTRACT

An active multi-module switching (MMS) system provides at least Tier-III level reliability to a data center using a UPS system with only N+1 redundancy. Only one additional UPS module is provided over the total number of UPS modules required to fully power the loads. The active MMS system includes a controller, a control circuit, and a number of distribution units each having electrically operated circuit breakers and sensor components. The active MMS system operates to control the switching components on each of the UPS modules as well as to selectively connect/disconnect individual UPS modules from MMS operation. This allows for disconnection of a UPS module from the critical load bus whenever maintenance on the UPS module is required.

20 Claims, 30 Drawing Sheets

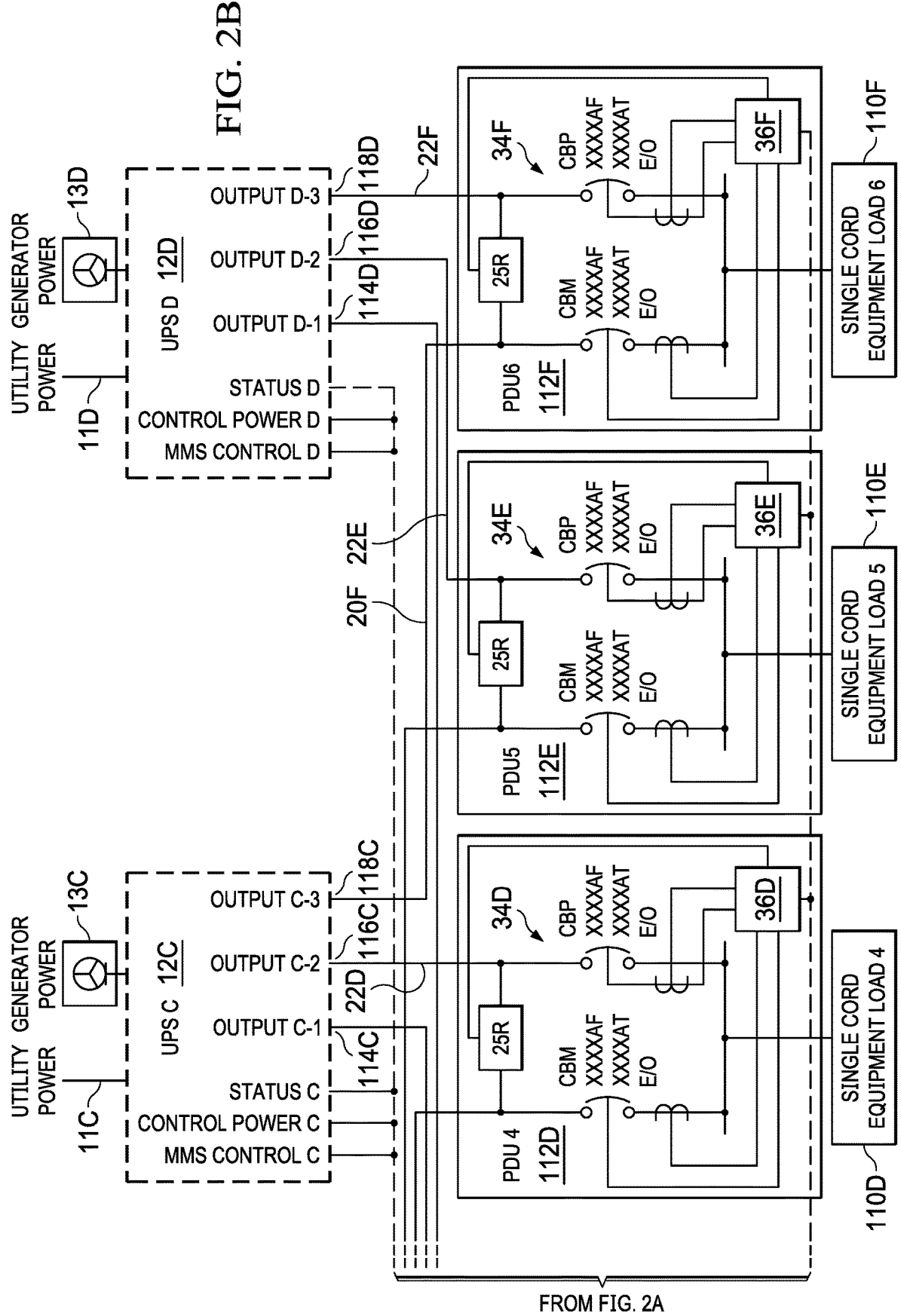

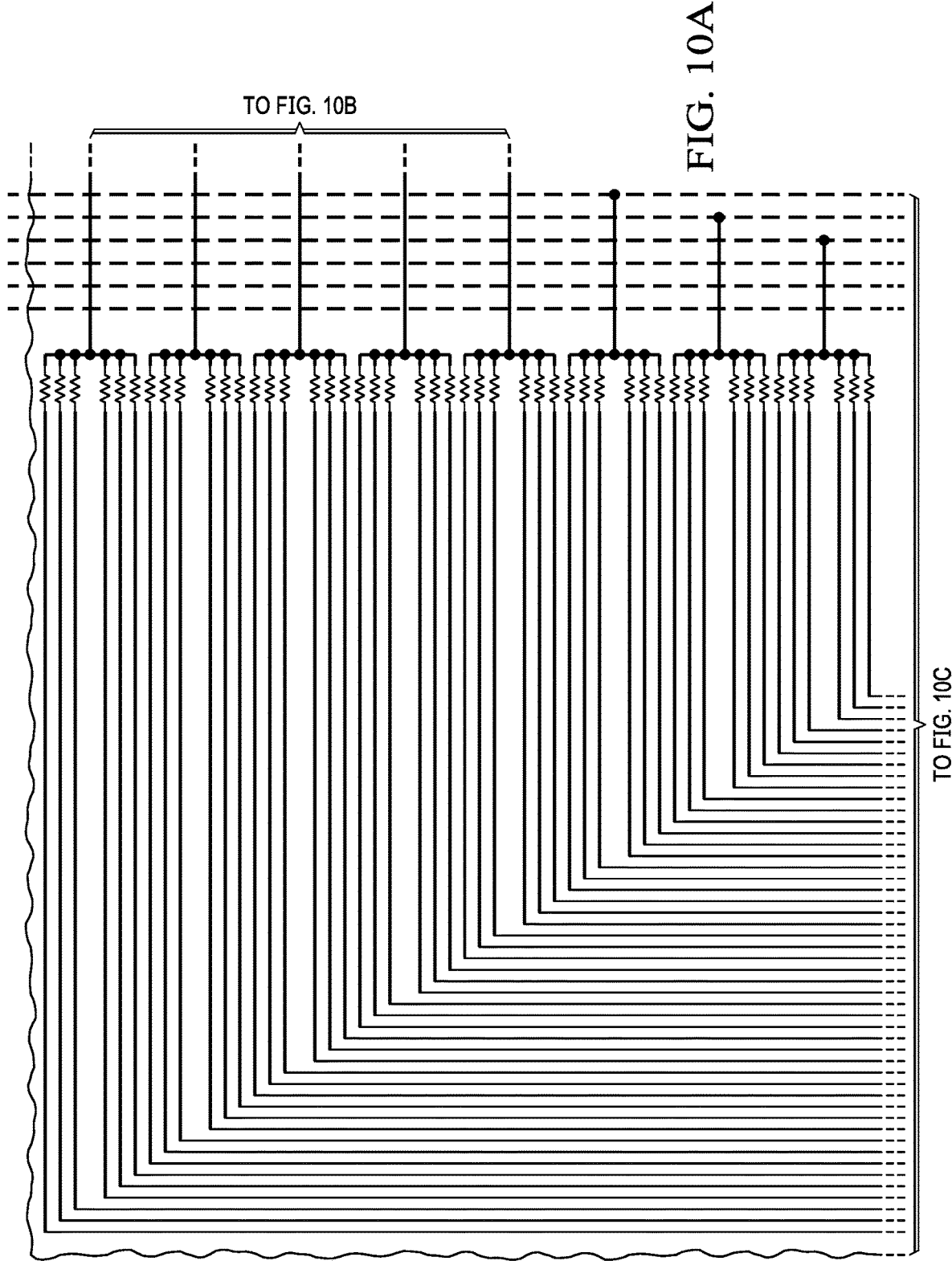

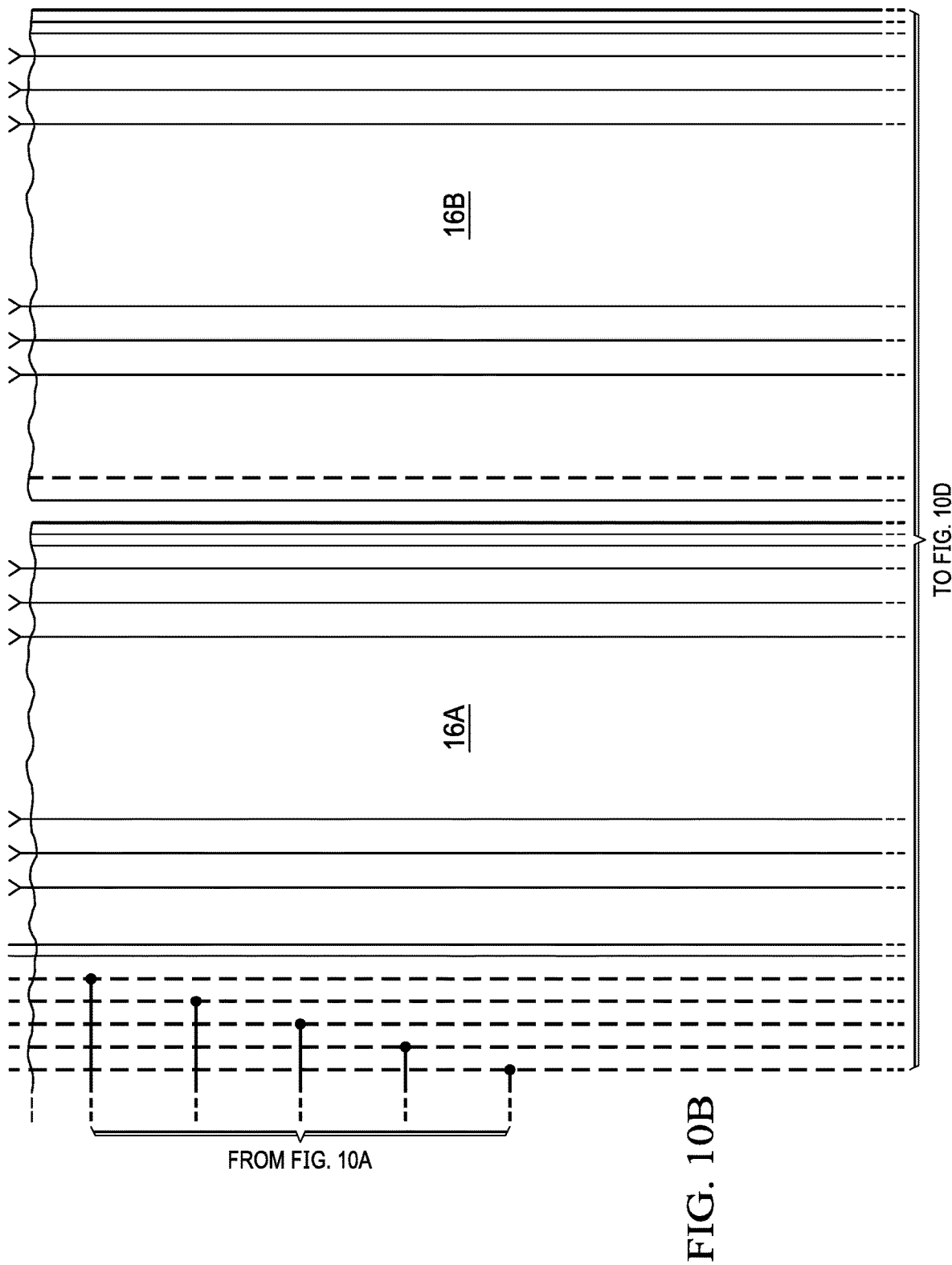

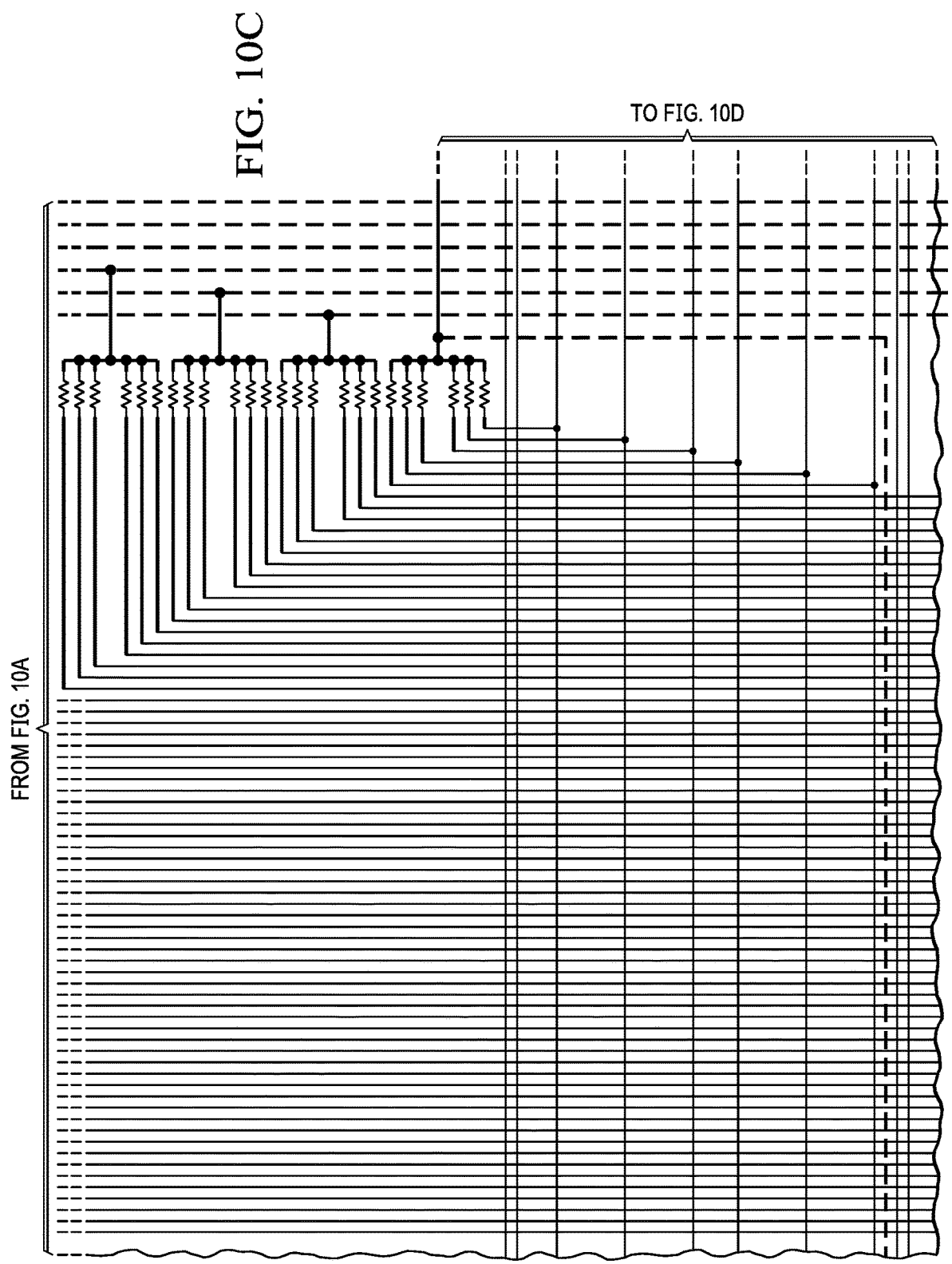

ACTIVE MULTI-MODULE SWITCHING SYSTEM AND METHOD

CROSS REFERENCE TO RELATED APPLICATION

This application claims priority to U.S. Provisional Patent Application No. 62/507,594, entitled "Active Multi-Module Switching System and Method", filed on May 17, 2017.

TECHNICAL FIELD

Embodiments of the present disclosure relate to uninterruptible power supply (UPS) systems and, more particularly, to an active multi-module switching system for controlling a UPS system.

BACKGROUND

Uninterruptible power supplies (UPS) are used to maintain power to data center loads in the event of an input power source failure. The UPS system provides power to data center components until either a backup generator is turned on or the components are appropriately shut down. Such UPS systems typically include multiple UPS modules that are electrically coupled to one or more data center loads. The number, capacity, and arrangement of these UPS modules can affect the reliability of the UPS system. For example, the number of UPS modules can be selected to be greater than a total number of UPS modules needed to power the connected loads operating at full power, thereby providing redundancy in the event that one of the UPS modules malfunctions. Data centers typically utilize UPS systems with at least some level of redundancy to prevent loss of data and system downtime. The redundancy of the UPS system (among other features) is used to determine the reliability rating of the overall system (e.g., Tier I, II, III, or IV reliability).

Currently available UPS technology uses two complete UPS systems in order to maintain conditioned power to a customer's critical data center loads while simultaneously performing maintenance/repairs to one or more UPS modules and/or other power distribution system components. This arrangement of UPS modules is referred to as having 2N (or 2N+1, 2(N+1), 2N+2, etc.) redundancy, meaning that twice the number of UPS modules are connected to the loads as are needed to fully power the loads. Although this arrangement provides the greatest level of redundancy and protection against single point failures, the two complete sets of UPS modules are expensive, complex, and take up a large amount of space within the data center.

SUMMARY

In accordance with the above, presently disclosed embodiments are directed to an active multi-module switching (MMS) system that provides at least Tier-III level reliability to a data center using a UPS system with only N+1 redundancy. That is, only one additional UPS module is provided over the total number of UPS modules required to power the loads. The active MMS system includes a controller, a MMS control circuit, and a number of distribution units each having electrically operated circuit breakers and sensor components (e.g., current sensing components, breaker position sensing components). The active MMS system operates to control the switching components on each of the UPS modules as well as to selectively connect/disconnect individual UPS modules from paralleled MMS operation. This allows for disconnection of a UPS module from the critical load bus whenever maintenance on the UPS module is required.

The disclosed active MMS system may be utilized in enterprise data centers, co-location data centers, military data centers, and any other data centers that require Tier-III reliability (concurrent maintainability) or Tier-IV reliability (concurrent maintainability while maintaining redundancy). The disclosed active MMS system may provide large data center customers with a Tier-III reliability level power solution at significant cost savings compared to existing 2N redundancy UPS designs due to the reduced complexity of the system and reduction of space taken up by the system.

BRIEF DESCRIPTION OF THE DRAWINGS

For a more complete understanding of the present disclosure and its features and advantages, reference is now made to the following description, taken in conjunction with the accompanying drawings, in which:

FIGS. 2A and 2B illustrate a schematic diagram of data center components including an active MMS system used to control the supply of power from a series of UPSs to single cord equipment loads, in accordance with an embodiment of the present disclosure;

FIGS. 10A-10D illustrate another portion of the circuit diagram showing more specific components of the board signals of FIG. 7, in accordance with an embodiment of the present disclosure;

DETAILED DESCRIPTION

Figure 1A:
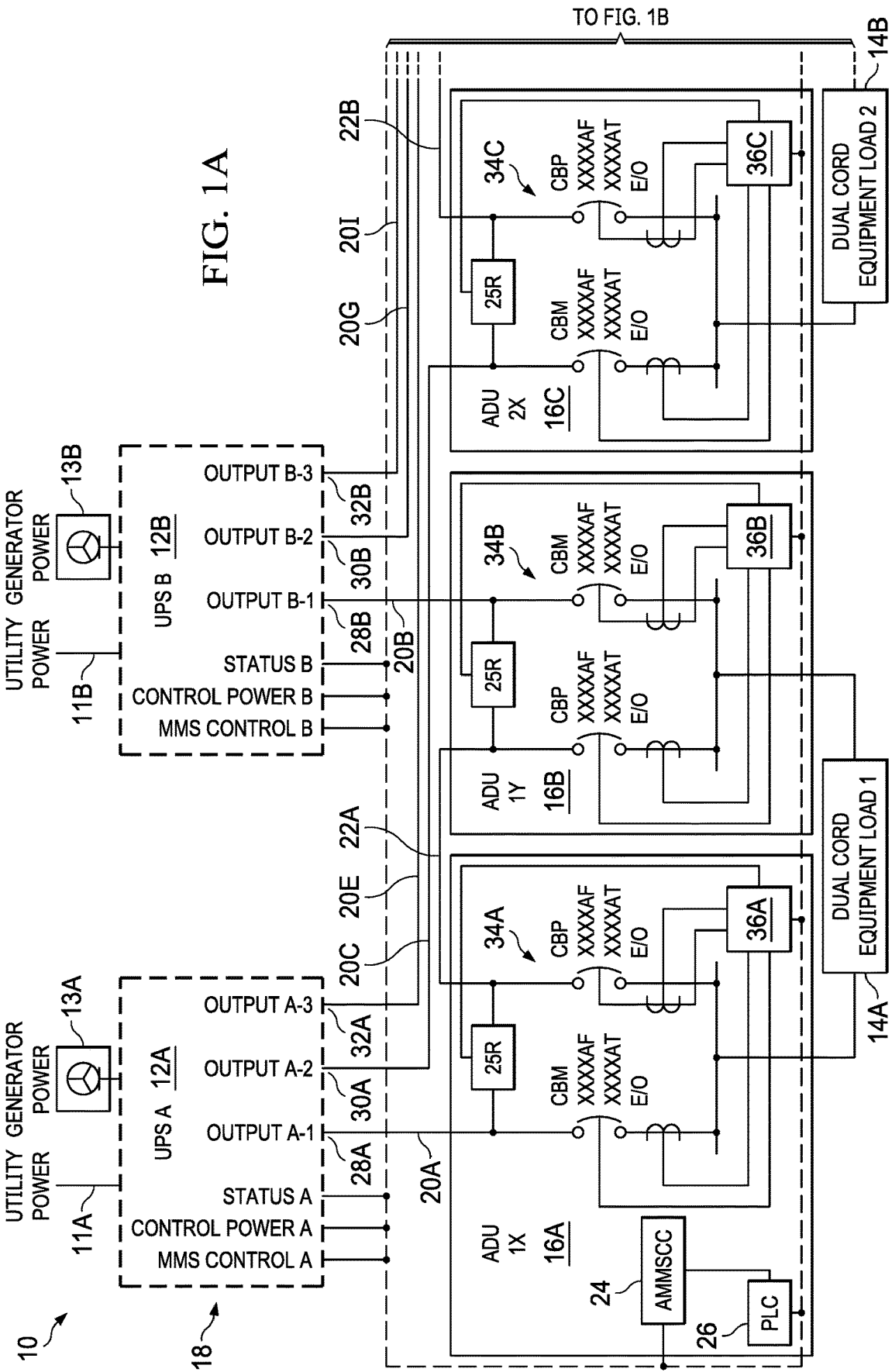
FIGS. 1A-1D illustrate a schematic diagram of data center components including an active multi-module switching (MMS) system used to control the supply of power from a series of uninterruptible power supplies (UPSs) to dual cord equipment loads, in accordance with an embodiment of the present disclosure.
Figure 1B:
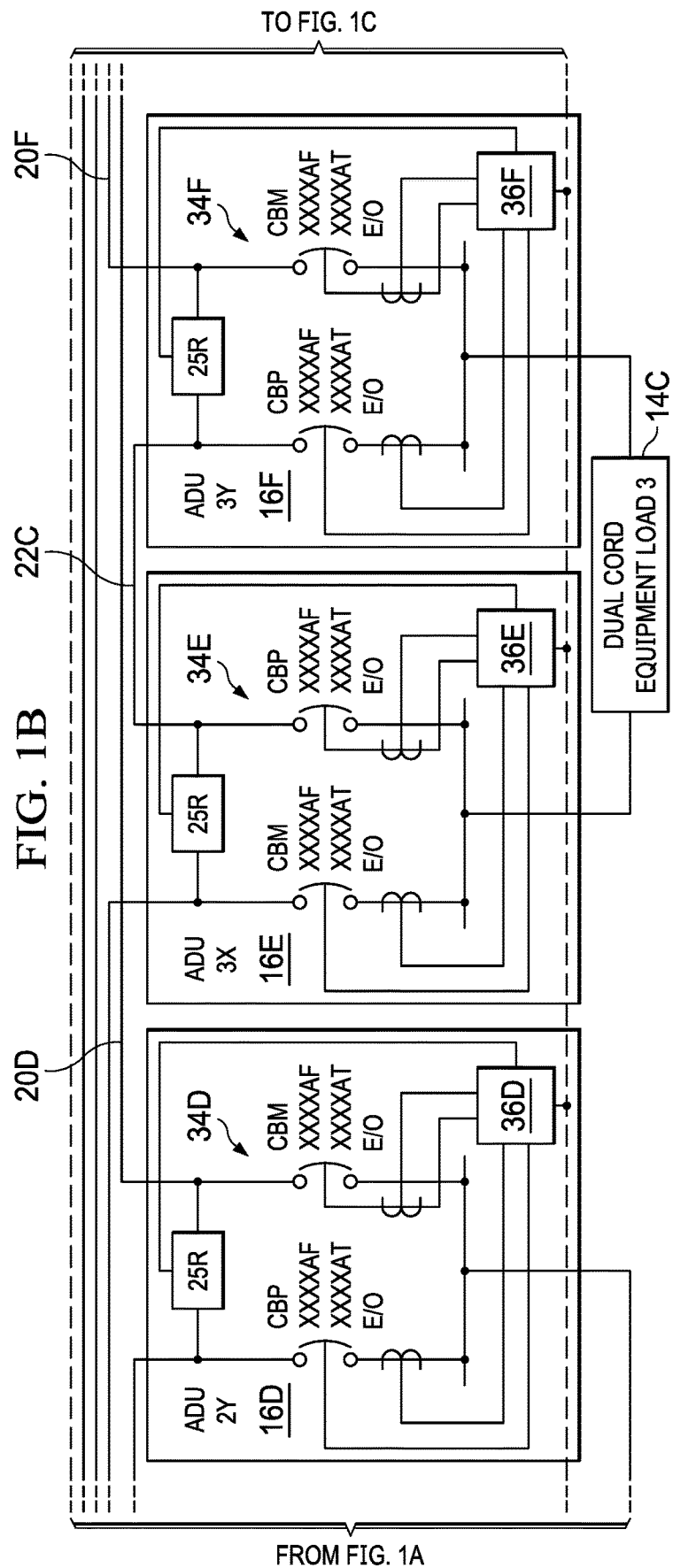
Figure 1C:
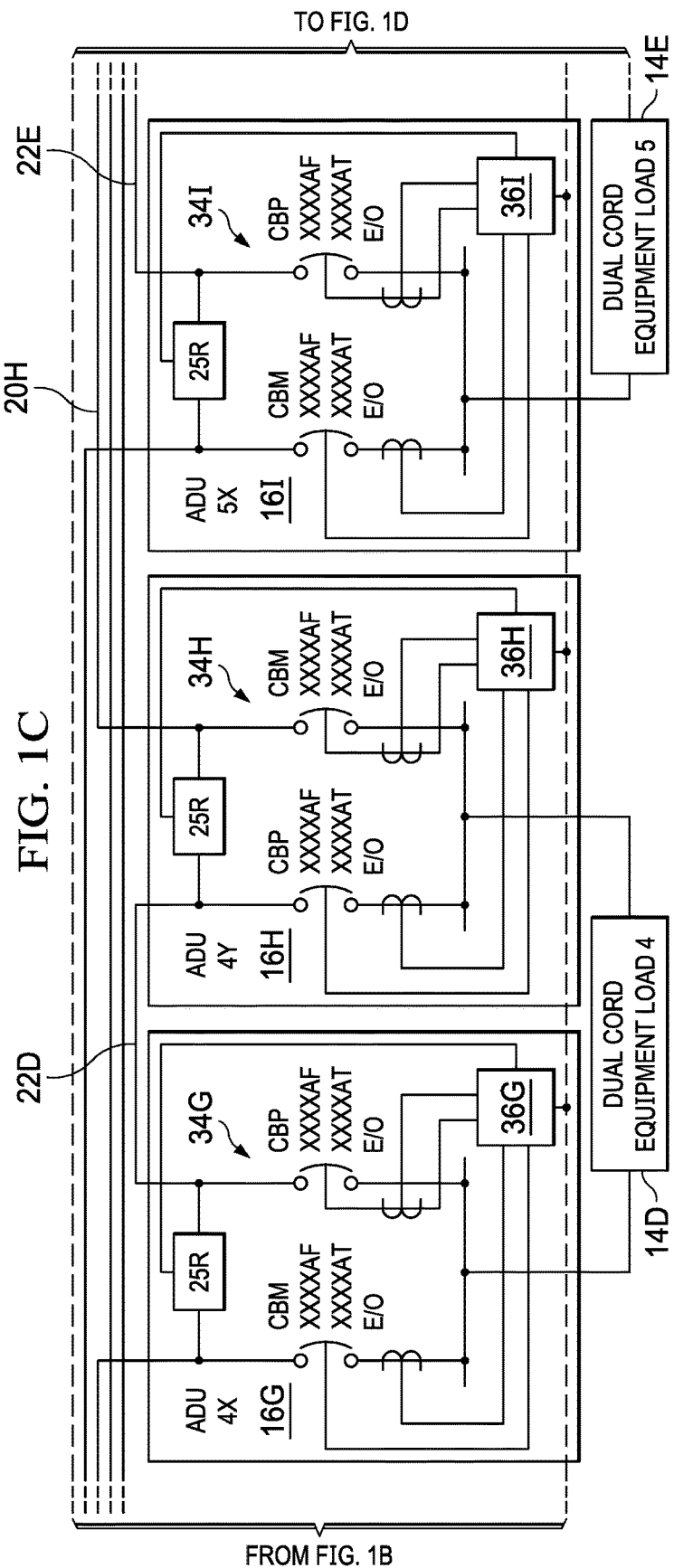
Figure 1D:
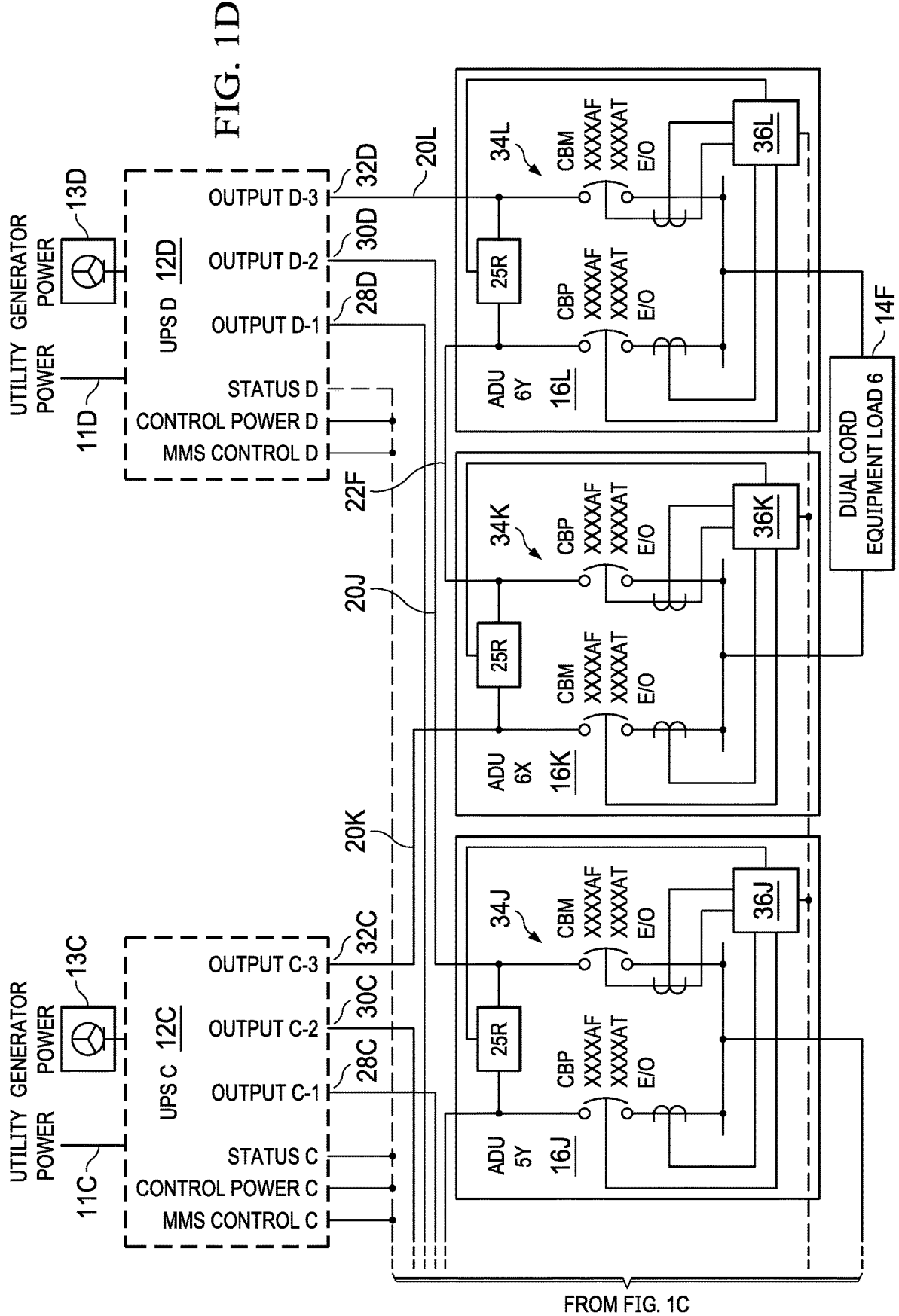

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Disclosed embodiments are directed to an active multi-module switching (MMS) system that provides Tier-III level reliability with only one N+1 redundant UPS system. The term N+1 redundant means that the UPS system includes the number (N) of UPS modules required to support the full data center load plus one additional UPS module for redundancy. This is different from 2N redundant UPS systems, which include exactly twice the number of UPS modules required to support the full data center load.

In existing UPS systems, different UPS architectures generally provide different levels of "availability". The term "availability" refers to an estimated percentage of time that electrical power will remain online and functioning to support a critical load. There are generally considered to be five different UPS system architectures that correspond to different levels of availability for data center loads. These configurations, from lowest to highest level of availability, are as follows: Capacity (N), Isolated Redundant, Parallel Redundant (N+1), Distributed Redundant, and System Plus System (2N, 2N+1).

Uptime Institute™ provides a commonly used "Tier Standard" through which to classify data centers within one of four "Tiers" regarding redundancy, reliability, and overall performance of the data center. Tier-I data centers are non-redundant (basic capacity) and offer the lowest level of reliability. Tier-II data centers provide redundant capacity for the UPS modules used therein. Tier-III data centers are redundant and provide concurrent maintainability, meaning the ability to shut down any particular electrical component for maintenance or testing without requiring the load to be transferred to utility power. Tier-IV data centers are redundant, provide concurrent maintainability, and provide fault tolerance. A person having ordinary skill in the art will be familiar with the particulars of these Tier classifications.

In existing UPS systems with N+1 redundant architecture, the system typically does not allow for concurrent maintainability and so is classified as having Tier-II level reliability. However, it is now recognized that a need exists for UPS systems with increased reliability but without the added costs associated with using a larger number of UPS modules to support the data center loads.

The disclosed active MMS system and method address the downsides associated with existing UPS systems that require large numbers of UPS modules and complex system architectures to provide Tier-III (or Tier-IV) reliability. The disclosed system utilizes N+1 UPS modules (i.e., the number of UPS modules to support full data center load plus one additional UPS module) to provide concurrent maintainability and therefore Tier-III level reliability or above to a data center. The disclosed system accomplishes this by sequencing control signals used to change the UPS modules' mode of operation from that of independent single module systems (SMS) to paralleled multi-module systems (MMS) and back.

The disclosed active MMS system utilizes load distribution power switching elements under the control of a controller, such as a programmable logic controller (PLC). The load distribution elements may take the form of a number of power distribution units (PDUs) electrically coupled between the N+1 UPS modules and the loads. The PDUs may include any desired type of distribution unit such as, for example, automatic distribution units (ADUs), dual-input PDUs, or static switch PDUs. In addition to the load distribution power switching elements, the PDUs may each include electrically operated circuit breakers and sensor components (e.g., current sensing components, breaker position sensing components). These electrical components may be communicatively coupled to the PLC of the MMS system.

The power switching elements of the MMS system may parallel the outputs of two UPS modules by connecting both UPS modules to a given load. The MMS system may simultaneously detect the paralleled condition (e.g., via sensing components in the associated PDUs) of the UPS modules electrically coupled to the load, and generate control signals to command the UPS modules that are in parallel to share the load equally.

When maintenance or repairs are required on one of the UPS modules, the active MMS system may disconnect the particular UPS module from the load. Simultaneously, the MMS system may detect the single-module condition of the load (e.g., via sensing components in the PDU associated with the connection between the disconnected UPS module and the load). The MMS system may then generate control signals to command the UPS modules to operate individually and stop the load sharing operation.

The ability of the active MMS system to change modes of the UPS modules between single module operation and paralleled operation facilitates maintenance in a manner which allows users of high-reliability UPS systems to achieve maximum system reliability and maintainability with minimum capital and operational expenditure, since fewer UPS modules are needed.

Turning now to the drawings, FIGS. 1A-1D and 2A-2B illustrate examples of an active multi-module switching (MMS) UPS system that may be used to power data center loads in accordance with the present disclosure. As mentioned above, the active MMS UPS systems described herein each utilize an N+1 architecture to provide Tier-III level reliability in maintaining power to the data center loads. FIGS. 1A-1D illustrate an active MMS UPS system 10 that includes a plurality of UPS modules 12 electrically coupled to dual cord equipment loads 14 via a plurality of distributed redundant automatic distribution units (ADUs) 16. Each UPS module 12 may be coupled to its own utility power source 11 and generator power source 13.

The loads 14 may be critical loads for a customer requiring Tier-III reliability within a data center. The disclosed MMS UPS system 10 may provide Tier-III level reliability to the critical loads 14 using a single N+1 redundant UPS system 18. The UPS system 18 includes the multiple UPS modules 12. The UPS system 18 includes a total number of UPS modules 12 that is one more than the number of UPS modules required to support all of the loads 14 operating at full power. For example, in the illustrated MMS UPS system 10, the UPS system 18 includes a total of four UPS modules 12, while the six loads 14 may be operated at full power using just power supplied from three of the four UPS modules 12. While the illustrated MMS UPS system 10 includes four UPS modules 12 and six loads 14, other numbers and arrangements of UPS modules 12 with N+1 redundancy and corresponding loads 14 may be present in other embodiments. In addition, a given data center may include multiple sets of distinct N+1 redundant UPS systems 18 each used to support a subset of the total number of critical loads 14 at the data center. For example, the MMS UPS system may include two N+1 redundant UPS systems 18 having four UPS modules 12 each, the UPS systems 18 each being used to power a separate set of six loads 14.

The MMS UPS system 10 may include multiple power distribution units (PDUs) for connecting the UPS modules 12 to the various loads. The PDUs in the illustrated embodiment are distributed redundant ADUs 16. However, other types of PDUs may be utilized in other embodiments (e.g., FIGS. 2A and 2B). ADUs 16 may be used for maintaining a power supply to dual cord equipment loads 12. The MMS UPS system 10 may include two ADUs 16 coupled to each dual cord equipment load 12. The term "dual cord equipment load" refers to a load having two separate power paths to which power can be supplied from different PDUs and UPSs. For example, in FIGS. 1A-1D, the first load ("load 1") 12A may receive power input from either of the ADUs 16A/16B (labeled "ADU 1X and ADU 1Y") electrically coupled thereto. Similar arrangements of two ADUs 16 for each load 12 are included in the MMS UPS system 10 of FIGS. 1A-1D. Specifically, "Load 2" 12B is electrically coupled to "ADU 2X" 16C and "ADU 2Y" 16D, "Load 3" 12C is electrically coupled to "ADU 3X" 16E and "ADU 3Y" 16F, "Load 4" 12D is electrically coupled to "ADU 4X" 16G and "ADU 4Y" 16H, "Load 5" 12E is electrically coupled to "ADU 5X" 16I and "ADU 5Y" 16J, and "Load 6" 12F is electrically coupled to "ADU 6X" 16K and "ADU 6Y" 16L. Each of the ADUs 16 coupled to a given equipment load 12 are coupled to a different power pathway of the load 12.

Each ADU 16 may be directly coupled directly to a single UPS module 12 via an electrical pathway 20 ("CBM" pathway). The ADUs 16 assigned to a given load 14 may be used to connect two different UPS modules 12 to the load 14 via these pathways 20. For example, as shown in FIGS. 1A-1D, the following set of connections 20 is provided by the multiple ADUs 16:

ADU 1X (16A) connects UPS A (12A) to Load 1 (14A) via pathway 20A;
ADU 1Y (16B) connects UPS B (12B) to Load 1 (14A) via pathway 20B;
ADU 2X (16C) connects UPS A (12A) to Load 2 (14B) via pathway 20C;
ADU 2Y (16D) connects UPS C (12C) to Load 2 (14B) via pathway 20D;
ADU 3X (16E) connects UPS A (12A) to Load 3 (14C) via pathway 20E;
ADU 3Y (16F) connects UPS D (12D) to Load 3 (14C) via pathway 20F;
ADU 4X (16G) connects UPS B (12B) to Load 4 (14D) via pathway 20G;
ADU 4Y (16H) connects UPS C (12C) to Load 4 (14D) via pathway 20H;
ADU 5X (16I) connects UPS B (12B) to Load 5 (14E) via pathway 20I;
ADU 5Y (16J) connects UPS D (12D) to Load 5 (14E) via pathway 20J;
ADU 6X (16K) connects UPS C (12C) to Load 6 (14F) via pathway 20K; and
ADU 6Y (16L) connects UPS D (12D) to Load 6 (14F) via pathway 20L.

Each ADU 16 may also be directly coupled to another ADU 16 via an electrical pathway 22 ("CBP" pathway). Specifically, the two ADUs 16 coupled to any given one of the loads 12 are also electrically coupled to each other via the CBP pathway 22. For example, as shown in FIGS. 1A-1D, the following set of connections 22 is provided between the multiple ADUs 16:

ADU 1X (16A) is connected to ADU 1Y (16B) via pathway 22A;
ADU 2X (16C) is connected to ADU 2Y (16D) via pathway 22B;
ADU 3X (16E) is connected to ADU 3Y (16F) via pathway 22C;
ADU 4X (16G) is connected to ADU 4Y (16H) via pathway 22D;
ADU 5X (16I) is connected to ADU 5Y (16J) via pathway 22E; and
ADU 6X (16K) is connected to ADU 6Y (16L) via pathway 22F.

The disclosed MMS UPS system 10 includes an active multi-module switching (MMS) control circuit 24 and a controller 26, described in greater detail below, that control operation of switching components in the ADUs 16 to selectively open and close the electrical pathways (CBM and CBP) between the various ADUs 16 and UPS modules 12.

As a result of this arrangement, each UPS module 12 may have three electrical outputs 28, 30, and 32 that may be selectively connected to three of the six loads 14. Two different UPS modules 12 may be selectively connected to each of the loads 14 via the ADUs 16, either one at a time or both in parallel. The ADUs 16 may each include circuitry that can be used to selectively parallel the electrical signals from the associated CBM and CBP pathways 20 and 22 leading to the ADU 16. The disclosed MMS control circuit 24 and controller 26 function to enable switching between powering of any given load 14 by one or both (in parallel) of the connected UPS modules 12 by controlling the opening and closing of switches in the ADUs 16. When maintenance or repairs are required on one of the UPS modules 12, the ADUs 16 associated with the outputs of that particular UPS module 12 may disconnect the UPS module 12 from its associated loads 14 in response to signals from the MMS control circuit 24 and controller 26.

Each of the ADUs 16 may include a circuit breaker 34 and one or more sensing components 36 (e.g., current sensing components and/or breaker position sensing components). The one or more sensing components 36 may include a Hall effect current transducer (HCT). The circuit breaker 34 may be controlled to selectively connect or disconnect a corresponding UPS module 12 from the corresponding load 14, e.g., by closing or opening the CBM or CBP pathways. The current sensing components and/or breaker position sensing components 36 may be utilized to detect whether or not a UPS module 12 is electrically connected to the corresponding load 14 as well as an amount of current flowing from the UPS module 12 to the load 14.

As mentioned above, the MMS UPS system 10 further includes the controller 26, which may be a programmable logic controller (PLC) or any other suitable type of controller, communicatively coupled to each of the ADUs 16 and each of the UPS modules 12 in the system 10. The term "PLC 26" will be used hereinafter as a shorthand for the disclosed controller 26, and it should be noted that the following description of the "PLC" is applicable to any other type of controller and is not limited specifically to a programmable logic controller. The PLC 26 may be communicatively coupled to the sensing components 36 on each of the ADUs 16, the circuit breaker 34 on each of the ADUs 16, control circuitry associated with each of the UPS modules 12, and/or sensing components associated with the UPS modules 12. The PLC 26 may receive sensor signals from the sensing components of the multiple ADUs 16 (and/or the UPS modules 12) and output control signals for operating the UPS modules 12 and the ADU circuit breakers in a desired manner. The PLC 26 may interpret input signals received from the sensing components of the system 10 and output control signals according to the active MMS control circuit 24 of the MMS UPS system 10.

Figure 2A:
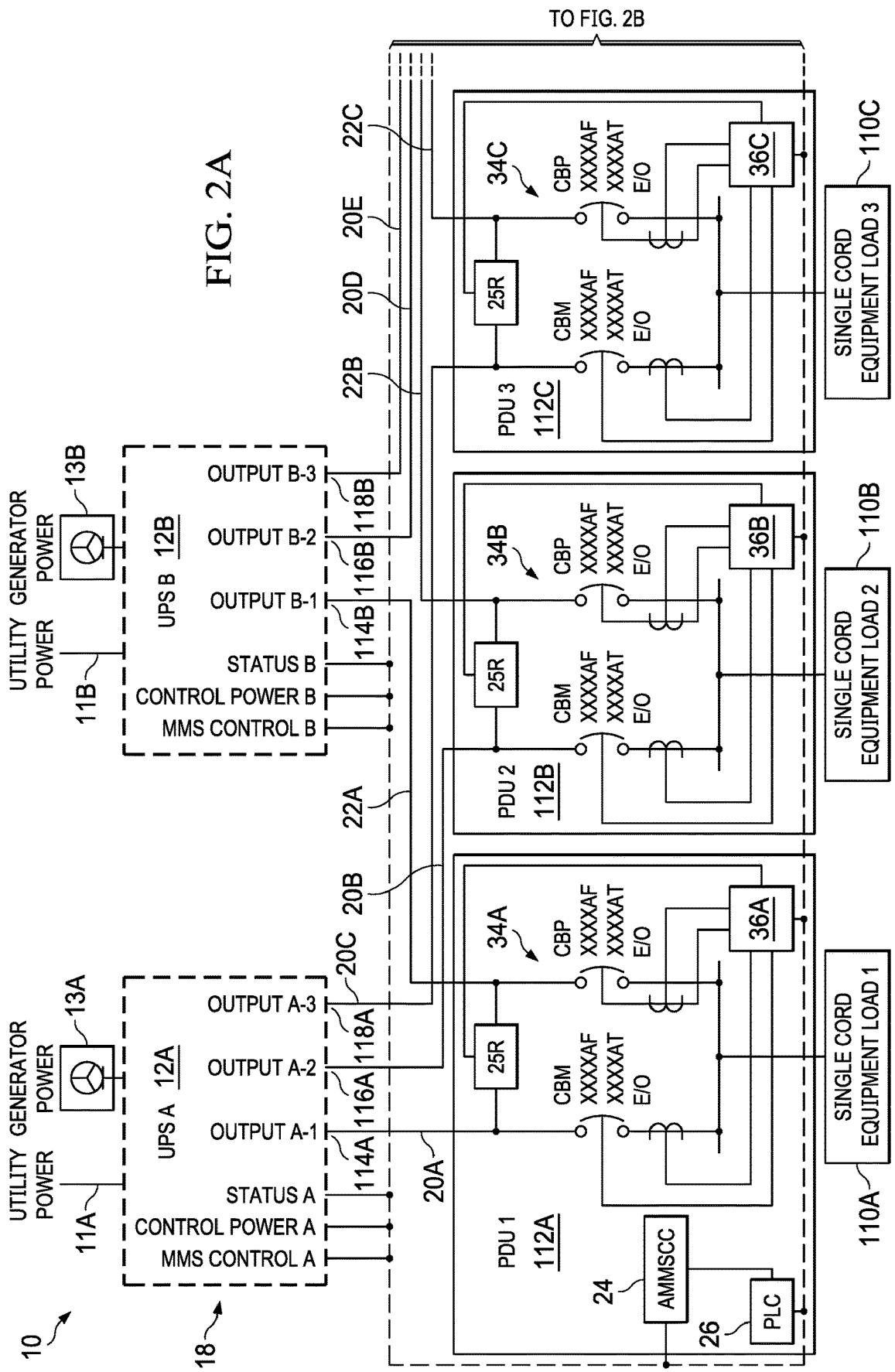

FIGS. 2A and 2B illustrate another embodiment of the active MMS UPS system 10 that includes a plurality of UPS modules 12 electrically coupled to single cord equipment loads 110 via a plurality of dual-input power distribution units (PDUs) 112. Each UPS module 12 may be coupled to its own utility power source 11 and generator power source 13.

The loads 110 may be critical loads for a customer requiring Tier-III reliability within a data center. The disclosed MMS UPS system 10 may provide Tier-III level reliability to the critical loads 110 using a single N+1 redundant UPS system 18. The UPS system 18 includes the multiple UPS modules 12. While the illustrated MMS UPS system 10 includes four UPS modules 12 and six loads 110, other numbers and arrangements of UPS modules 12 with N+1 redundancy and corresponding loads 110 may be present in other embodiments. In addition, a given data center may include multiple sets of distinct N+1 redundant UPS systems 18 each used to support a subset of the total number of critical loads 110 at the data center. For example, the MMS UPS system may include two N+1 redundant UPS systems 18 having four UPS modules 12 each, the UPS systems 18 each being used to power a separate set of six loads 110.

The MMS UPS system 10 may include multiple power distribution units (PDUs) for connecting the UPS modules 12 to the various loads 110. The PDUs 112 in the illustrated embodiment are dual input PDUs 112, meaning each PDU 112 may be electrically coupled to two different UPS modules 12 to receive power input therefrom. However, other types of PDUs may be utilized in other embodiments. The dual input PDUs 112 may be used for maintaining a power supply to the single cord equipment loads 110. The MMS UPS system 10 may include one dual-input PDU 112 coupled to each single cord equipment load 110. The term "single cord equipment load" refers to a load having a single power path through which power can be supplied from the associated PDU 112 and multiple UPSs 12. For example, in FIGS. 2A and 2B, the first load ("load 1") 110A may receive power input from the PDU 112A (labeled "PDU 1") electrically coupled thereto. Similar arrangements of a single PDU 112 for each load 110 are included in the MMS UPS system 10 of FIGS. 2A and 2B. Specifically, "Load 2" 110B is electrically coupled to "PDU 2" 112B, "Load 3" 110C is electrically coupled to "PDU 3" 112C, "Load 4" 110D is electrically coupled to "PDU 4" 112D, "Load 5" 110E is electrically coupled to "PDU 5" 112E, and "Load 6" 110F is electrically coupled to "PDU 6" 112F. Each PDU 112 is coupled to its given equipment load 110 via the single power pathway of the load 110.

Each PDU 112 may be directly coupled to a first UPS module 12 via a first electrical pathway 20 ("CBM" pathway) and directly coupled to a second UPS module 12 via a second electrical pathway 22 ("CBP" pathway). The PDU 112 assigned to a given load 110 may be used to connect two different UPS modules 12 to the load 110 via these pathways 20 and 22. For example, as shown in FIGS. 2A and 2B, the following sets of connections 20 and 22 are provided by the multiple PDUs 112:

PDU 1 (112A) connects UPS A (12A) to Load 1 (110A) via pathway 20A;
PDU 1 (112A) connects UPS B (12B) to Load 1 (110A) via pathway 22A;
PDU 2 (112B) connects UPS A (12A) to Load 2 (110B) via pathway 20B;
PDU 2 (112B) connects UPS C (12C) to Load 2 (110B) via pathway 22B;
PDU 3 (112C) connects UPS A (12A) to Load 3 (110C) via pathway 20C;
PDU 3 (112C) connects UPS D (12D) to Load 3 (110C) via pathway 22C
PDU 4 (112D) connects UPS B (12B) to Load 4 (110D) via pathway 20D;
PDU 4 (112D) connects UPS C (12C) to Load 4 (110D) via pathway 22D;
PDU 5 (112E) connects UPS B (12B) to Load 5 (110E) via pathway 20E;
PDU 5 (112E) connects UPS D (12D) to Load 5 (110E) via pathway 22E;
PDU 6 (112F) connects UPS C (12C) to Load 6 (110F) via pathway 20F; and
PDU 6 (112F) connects UPS D (12D) to Load 6 (110F) via pathway 22F.

The disclosed MMS UPS system 10 includes the active multi-module switching (MMS) control circuit 24 and the controller 26, which control the operation of switching components in the PDUs 112 to selectively open and close the electrical pathways (CBM and CBP) between the various PDUs 112 and UPS modules 12.

As a result of this arrangement, each UPS module 12 may have three electrical outputs 114, 116, and 118 that may be selectively connected to three of the six loads 110. Two different UPS modules 12 may be selectively connected to each of the loads 110 via the PDUs 112, either one at a time or both in parallel. The PDUs 112 may each include circuitry that can be used to selectively parallel the electrical signals from the associated CBM and CBP pathways 20 and 22 leading to the PDU 112. The disclosed MMS control circuit 24 and controller 26 function to enable switching between powering of any given load 110 by one or both (in parallel) of the connected UPS modules 12 by controlling the opening and closing of switches in the PDUs 112. When maintenance or repairs are required on one of the UPS modules 12, the PDUs 112 associated with the outputs of that particular UPS module 12 may disconnect the UPS module 12 from its associated loads 110 in response to signals from the MMS control circuit 24 and controller 26.

Each of the PDUs 112 may include a circuit breaker 34 and one or more sensing components 36 (e.g., current sensing components and/or breaker position sensing components). The one or more sensing components 36 may include a Hall effect current transducer (HCT). The circuit breaker 34 may be controlled to selectively connect or disconnect a corresponding UPS module 12 from the corresponding load 110, e.g., by closing or opening the CBM or CBP pathways. The sensing components 36 (e.g., current sensing components and/or breaker position sensing components) may be utilized to detect whether or not the UPS module 12 is electrically connected to the corresponding load 110 as well as an amount of current flowing from the UPS module 12 to the load 110.

As mentioned above, the MMS UPS system 10 further includes the controller 26, which may be a programmable logic controller (PLC) communicatively coupled to each of the PDUs 112 and each of the UPS modules 12 in the system 10. More specifically, the PLC 26 may be communicatively coupled to the sensing components (e.g., current and/or breaker position sensing components) 36 on each of the PDUs 112, the circuit breaker 34 on each of the PDUs 112, control circuitry associated with each of the UPS modules 12, and/or sensing components associated with the UPS modules 12. The PLC 26 may receive sensor signals from the sensing components 36 of the multiple PDUs 112 (and/or the UPS modules 12) and output control signals for operating the UPS modules 12 and the PDU circuit breakers 34 in a desired manner. The PLC 26 may interpret input signals received from the sensing components of the MMS UPS system 10 and output control signals according to the active MMS control circuit 24 of the MMS UPS system 10.

Figure 3:
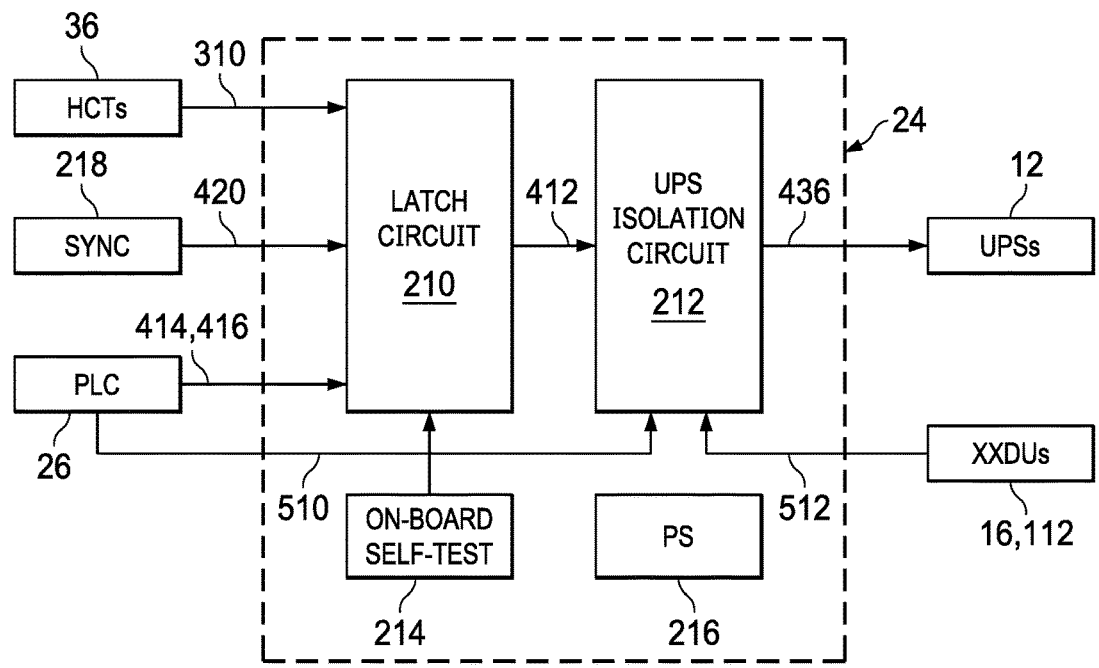
FIG. 3 is a schematic block diagram illustrating MMS control circuit logic of the active MMS system of FIGS. 1 and 2, in accordance with an embodiment of the present disclosure.

FIG. 3 provides a schematic block diagram illustrating circuitry components that may be present in the disclosed MMS control circuit 24 that controls operations of the PDUs/ADUs and other components of the MMS UPS system 10. The same type of control circuit 24 may be utilized with both the MMS UPS systems 10 of FIGS. 1A-1D and 2A-2B.

As illustrated, the MMS control circuit 24 may include a latch circuit 210, a UPS isolation circuit 212, an on-board self-test 214, and a power supply 216, among other components. The MMS control circuit 24 may receive input signals from various other components of the overall system. For example, the MMS control circuit 24 may receive input signals from the sensor components 36, in this case Hall effect current transducers (HCTs), located within the associated PDU or ADU (referred to hereinafter by the term "XXDU") 16, 112. The following discussion will refer to "HCTs 36" as a shorthand for the term sensor components 36, although the same techniques are applicable for any sensor components used to detect current or breaker position and is not limited to Hall effect current transducers. The MMS control circuit 24 may also receive input signals from synchronizing relays 218 (which may be located within the XXDU 16, 112, denoted as "R25" in FIGS. 1A-1D and 2A-2B), the controller 26, and the XXDU 16, 112. The MMS control circuit 24 may output control signals to the UPS modules 12 for controlling UPS operation based on the received input signals. A detailed description of the process for controlling the UPS modules 12 via the MMS control circuit 24 will now be provided.

Figure 4A:
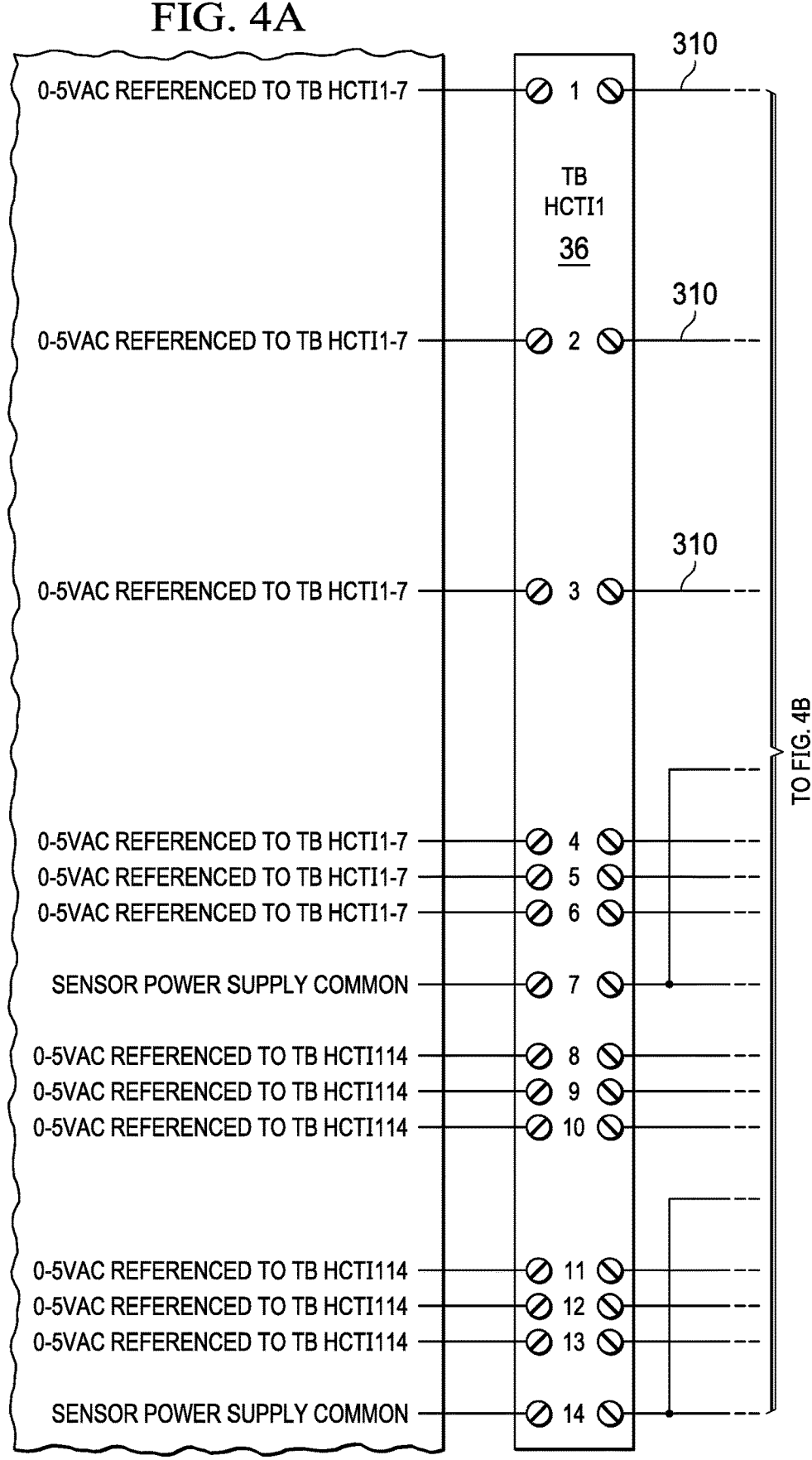
FIGS. 4A-4B illustrate a portion of a circuit diagram showing more specific components of the MMS control circuit of FIG. 3, in accordance with an embodiment of the present disclosure.
Figure 4B:
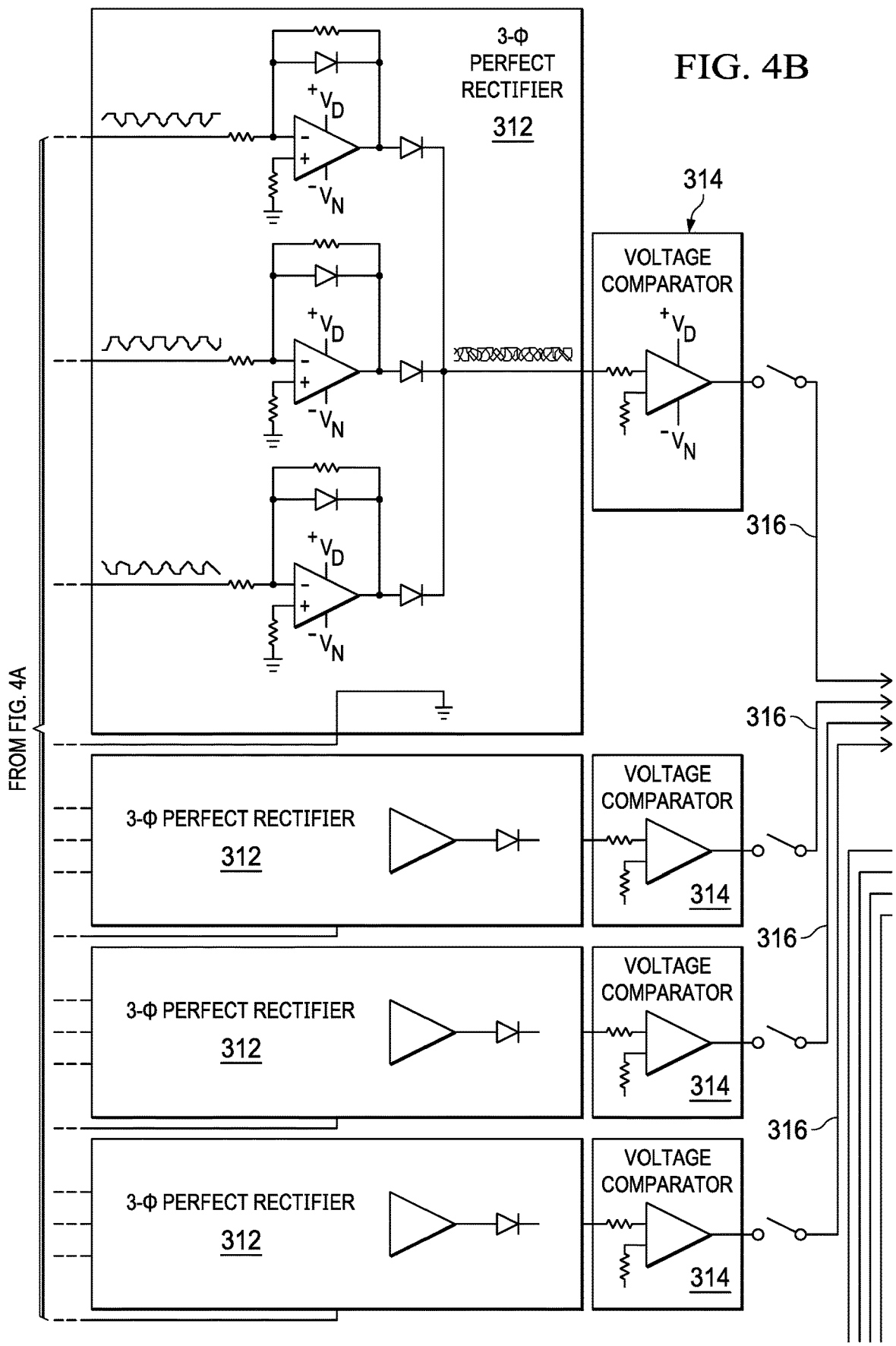
Figure 5:
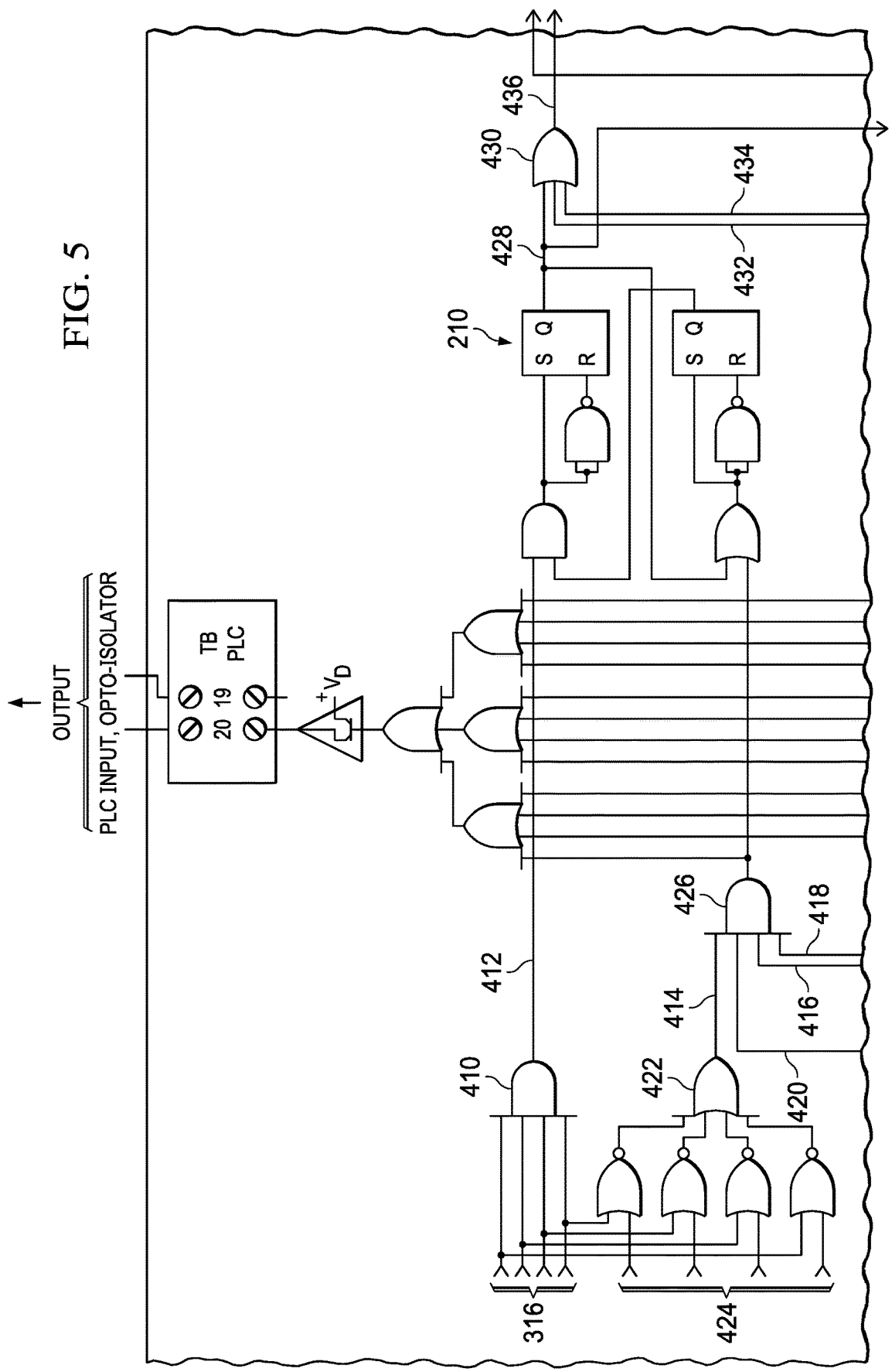
FIG. 5 is another portion of the circuit diagram showing more specific components of the MMS control circuit of FIG. 3, in accordance with an embodiment of the present disclosure.

An external control system (PLC 26) may control electrically operated circuit breakers (34 of FIGS. 1A-1D and 2A-2B) to connect/disconnect UPS module outputs in and out of parallelism. The MMS control circuit 24 may receive the status of these breakers 34 via the HCTs (or other sensors) 36. An example of a portion of the control circuit 24 acting immediately on these status signals is illustrated in FIGS. 4A and 4B. As shown, the status of the breakers is represented as 0-5 VAC HCT outputs, representing 0.0 Amps to a maximum HCT rating Amps per phase (3-phase system). These signals 310 may be converted to a logic "true" signal (via a rectifier 312 and voltage comparator 314) indicating current flow greater than 0.0 Amps (which indicates that the pathway is closed). From one to four (depending on the external system configuration) of these signals 316 determined from HCT outputs may then be combined, as shown in an example circuit of FIG. 5. The signals 316 may be combined via an "AND" function 410 into a single logic "true" signal 412 indicating current flow in multiple paths, signifying paralleled UPS module outputs. This "paralleled" signal 412 may then be sent to the latch circuit 210.

The latch circuit 210 has four enabling inputs. These include an HCT/Aux Fault signal 414, a UPS status signal 416, an on-board self-test signal 418, and a sync UPS "N" to UPS "R" signal 420. The HCT/Aux Fault signal 414 is an on-board signal generated via an "OR" function 422 indicating an HCT has a non-zero output (signals 316) while the associated Aux contact is open, or an HCT has a zero output while the associated Aux contact (signal 424) is closed. The UPS status signal 416 is an externally generated contact closure indicating all UPS modules and ancillary equipment are in the proper mode of operation. The UPS status signal 416 may be provided to the latch circuit 210 from the PLC (26 of FIG. 3). The on-board self-test signal 418 is an indication that the on-board power supply (216 of FIG. 3) and any other critical circuitry are operable. The on-board self-test signal 418 is generated via the on-board self-test circuit (214 of FIG. 3). The sync UPS "N" to UPS "R" signal 420 is input from the synchronizing relays (218 of FIG. 3).

The logic of the latch circuit 210 is as follows: if all four enabling signals 414, 416, 418, and 420 are "true" (based on "AND" function 426) and the "paralleled" signal 412 is true, the latch is set to "on". Once the latch is on, it will remain latched regardless of the status of the enabling signals 414, 416, 418, and 420. Only when the "paralleled" signal 412 becomes "false" may the latch reset via the latch circuit 210. The latch circuit 210 may output a "latched paralleled" signal 428 when the latch is on. The "latched paralleled" signal 428 may be sent to gating ("OR" function) circuits 430. Each gating circuit 430 to which the signal 428 is provided is associated with one of the XXDUs 16, 112 that a corresponding UPS module is electrically coupled to. FIGS. 4A, 4B, 5, and 6 illustrate the circuitry used to control a first UPS module (12 of FIG. 3) of several within the system based on information received from at least a first XXDU 16, 112 of the system. Each gating circuit 430 allows any one of three appropriate "latched paralleled" signals 428, 432, and 434 to be input to the associated UPS isolation circuits (212 of FIG. 3). The "latched paralleled" signals 432 and 434 may come from a similar latch circuit that receives inputs associated with the second and third XXDUs 16, 112. The "latched paralleled" signal that is eventually input to the UPS isolation circuit is represented by the element number 436.

Figure 6:
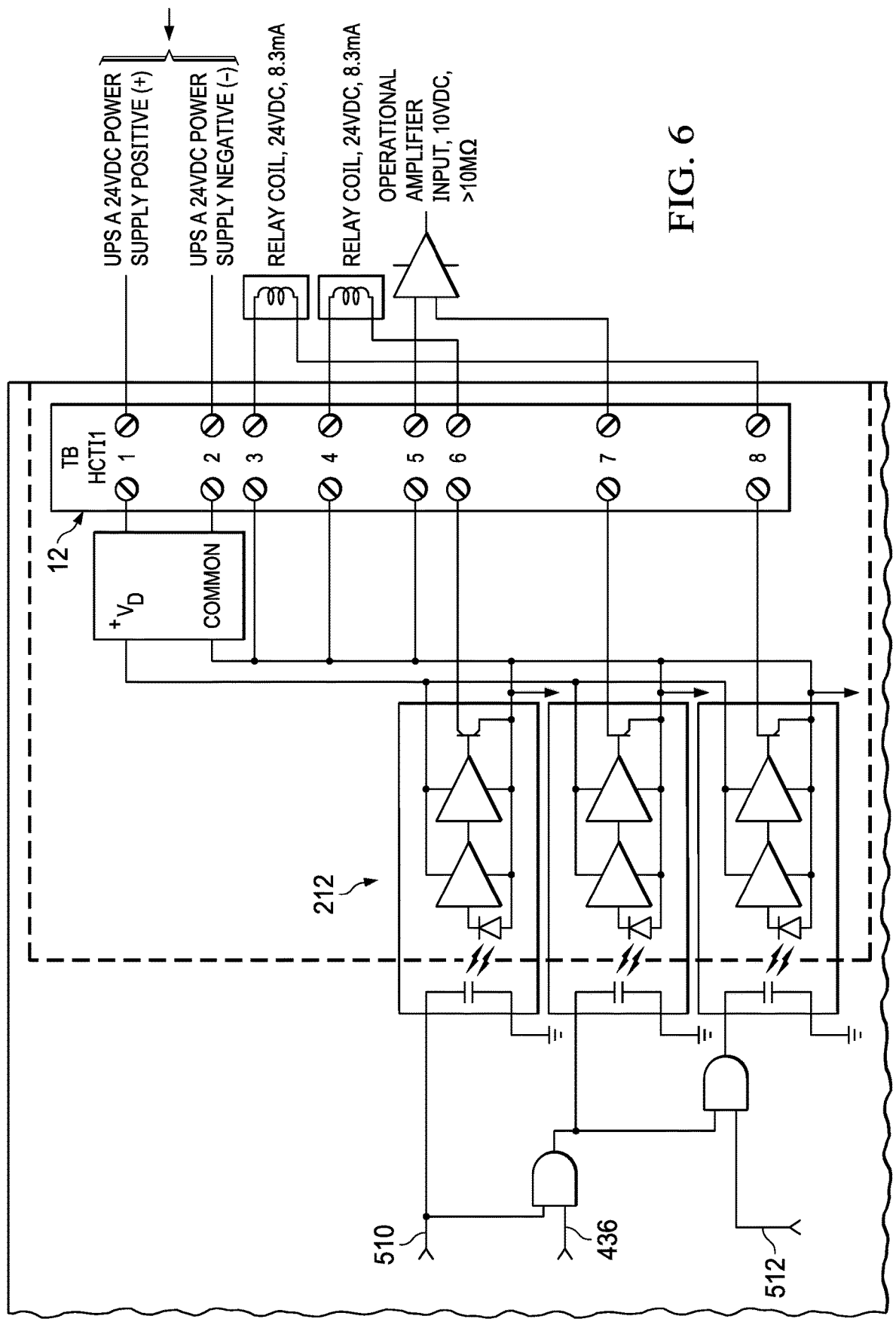
FIG. 6 is another portion of the circuit diagram showing more specific components of the MMS control circuit of FIG. 3, in accordance with an embodiment of the present disclosure.

FIG. 6 illustrates an example UPS isolation circuit 212. It should be understood that although only one UPS isolation circuit 212 is illustrated, each UPS module 12 of the overall system will have its own UPS isolation circuit 212. The isolation circuit 212 receives three inputs: a UPS Pre MMS signal 510, a CBP Aux signal 512, and the "latched paralleled" signal 436. The UPS Pre MMS signal 510 is an externally generated contact closure based on maintenance switch position and external control circuitry sequencing. The UPS Pre MMS signal 510 may be input to the UPS isolation circuit 212 from PLC (26 of FIG. 3). At any given point in the process, a combination of two UPS Pre MMS signals 510 will be "true", enabling only the appropriate pair of UPS isolation circuits 212 within the overall system. The CBP Aux signal 512 is a redundant indication of an external circuit breaker closure indicating paralleled UPS modules (12). The CBP Aux signal 512 may be input to the UPS isolation circuit 212 from the XXDU (16, 112 of FIG. 3). The "latched paralleled" signal 436 is the primary indication of paralleled UPS modules (12). The UPS isolation circuit 212 may optically isolate the UPS connection from the MMS control circuit 24 to preclude grounding issues and propagating faults. An open collector output may be utilized.

The UPS isolation circuit 212 operates as follows. A "true" Pre MMS input 510 generates the UPS "N" MMS Command to UPS "N", meaning that UPS module "N" will be operated in multi-module switching (MMS) mode in preparation for its output to be paralleled with that of another UPS module. A "true" Pre MMS input 510 "AND" "latched paralleled" input 436 generates the UPS "N" Load Share Command to UPS "N", meaning that the UPS module "N" will be operated in multi-module switching (MMS) mode while actively providing power to a specific load in parallel with another UPS module. A "true" Pre MMS input 510 "AND" the "latched paralleled" input 436 "AND" a CBP Aux input 512 generates a UPS "N" CBP Aux output to UPS "N", which acts as a confirmation of the parallel load sharing operation. As discussed in detail below, when switching from one UPS module (e.g., module 12A) to another (e.g., module 12B), the UPS modules will be brought into parallel load-sharing operation via signals to the UPS modules in the following sequence: UPS "N" MMS Command, followed by the UPS "N" Load Share Command, and finally followed by the UPS "N" CBP Aux output.

Power for each of the UPS isolation circuits 212 may be provided from the associated UPS 12 (24 VDC). This power is not tested by the on-board self-test circuitry (214 of FIG. 3). The specific circuitry shown on the schematic diagrams of FIGS. 4A, 4B, 5, and 6 is for reference to function only. The actual circuit design may be different depending on the circuit board design/build vendor. Switches are shown in the circuitry only to indicate that the input to that section of the circuitry may or may not be present and that the downstream logic operates as if the input were present and true.

Using the disclosed MMS control circuit 24, the total input-to-output signal processing time (from the HCT input voltage level exceeding the noise floor to the UPS "N" Load Share Command voltage level dropping below 3 VDC) is less than or equal to 20 microseconds. Propagation speed of the other input-to-output circuits is not critical.

Figure 7:
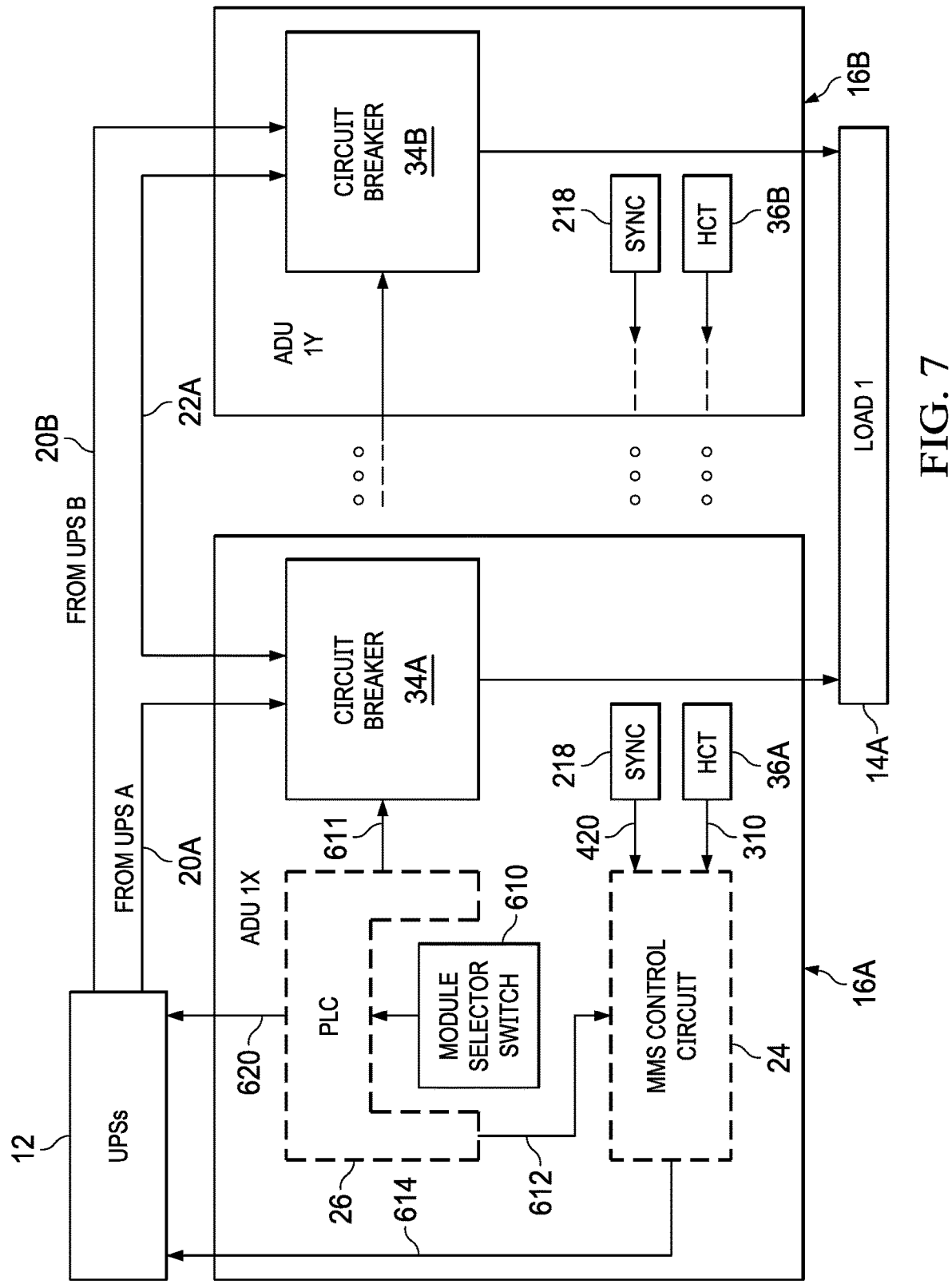
FIG. 7 is a schematic block diagram illustrating board signals for the active MMS system of FIG. 1, in accordance with an embodiment of the present disclosure.
Figure 8:
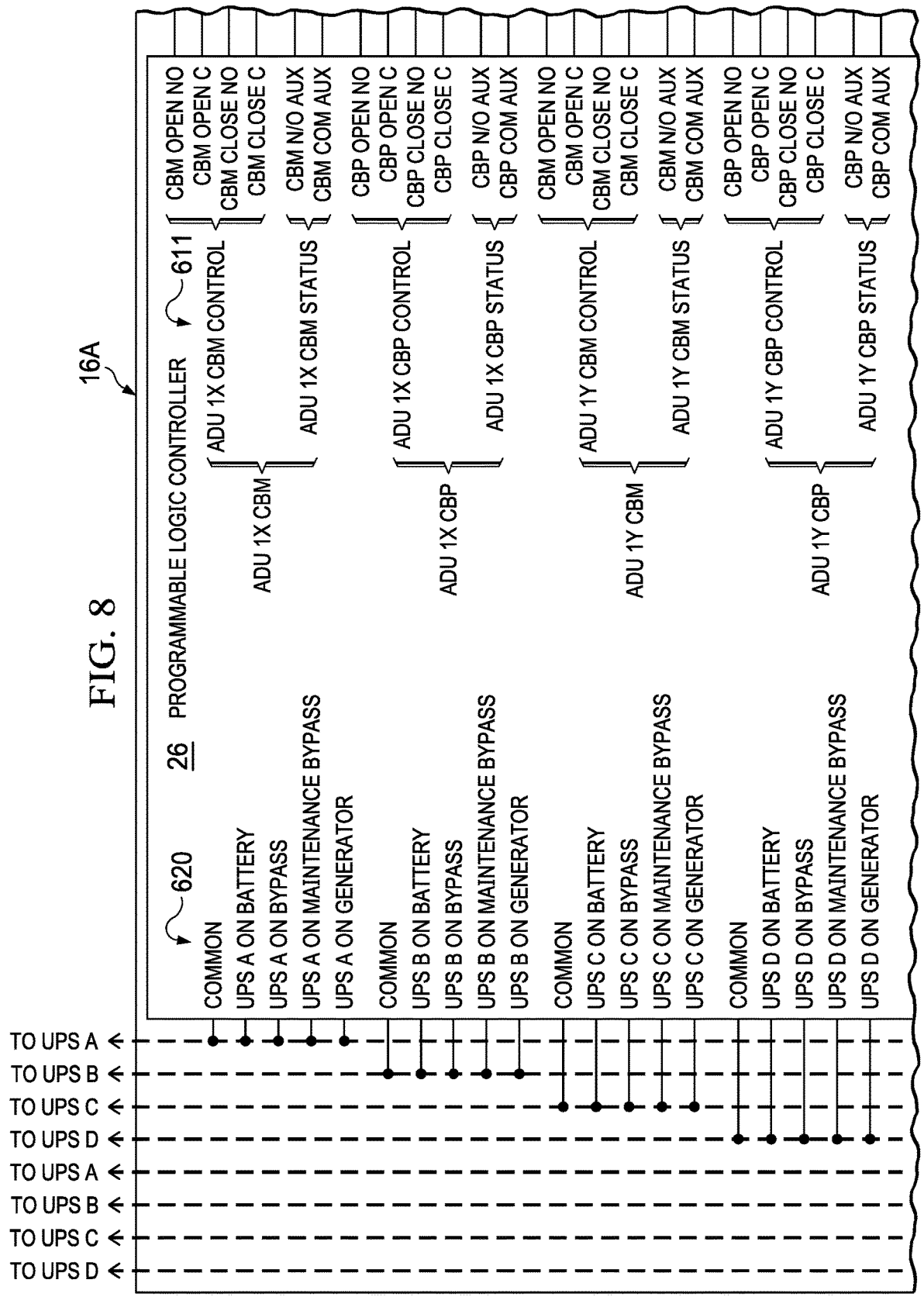
FIG. 8 is a portion of a circuit diagram illustrating more specific components of the board signals of FIG. 7, in accordance with an embodiment of the present disclosure.

FIG. 7 is a schematic block diagram illustrating various circuitry and other components that make up the disclosed MMS UPS system 10 of FIGS. 1A-1D (having distributed redundant ADUs 16). The block diagram shows the PLC 26, MMS control circuit 24, UPS modules 12, a single load 14 (e.g., 14A), and one pair of ADUs 16 (ADU 1X and ADU 1Y) with associated circuitry that may be used in the disclosed active MMS system. Although the block diagram is shown in the context of a single pair of ADUs 16A and 16B, it should be noted that similar inputs and outputs are communicated between the PLC 26, MMS control circuit 24, and the circuitry within the other distributed redundant ADUs 16 of the system (e.g., ADUs 16C-16L of FIGS. 1A-1D). The block diagram of FIG. 7 is merely simplified for ease of discussion, although lines used to connect the PLC 26 and MMS control circuit 24 to other ADUs 16 are illustrated in the example circuitry diagrams of FIGS. 8, 9A, 9B, 10A-10D, 11, 12, and 13A-13B.

As shown in FIG. 7, the PLC 26 is in communication with the MMS control circuit 24. The PLC 26 may be coupled to a module selector switch 610 that signals the PLC 26 regarding which UPS modules 12 are to be connected to the various loads 14. The module selector switch 610 may be a user interface that allows an operator to select a particular UPS module 12 for disconnecting from the MMS system so that maintenance or repairs can be performed on the UPS module 12.

Upon receiving signals from the module selector switch 610, the PLC 26 may output desired command signals 611 to the circuit breakers 34A and 34B of the ADUs 16A and 16B, respectively. The PLC 26 may communicate input signals 612 indicative of the HCT/Aux Fault condition 414, UPS status 416, and UPS Pre MMS condition 510 of each connected UPS module to the MMS control circuit 24. A more detailed example of the signals 612 communicated between the PLC 26 and the MMS control circuit 24 is provided in FIGS. 13A and 13B, along with a view of the options for the module selector switch 610. The MMS control circuit 24 may also receive current input signals 310 from the sensors components (e.g., HCTs) 36 located in each of the ADUs 16 (shown in more detail in FIGS. 10A-10D and 11), and sync input signals 420 from the synchronizing relays 218 in each of the ADUs 16 (shown in more detail in FIGS. 9A, 9B, and 11).

Figure 12:
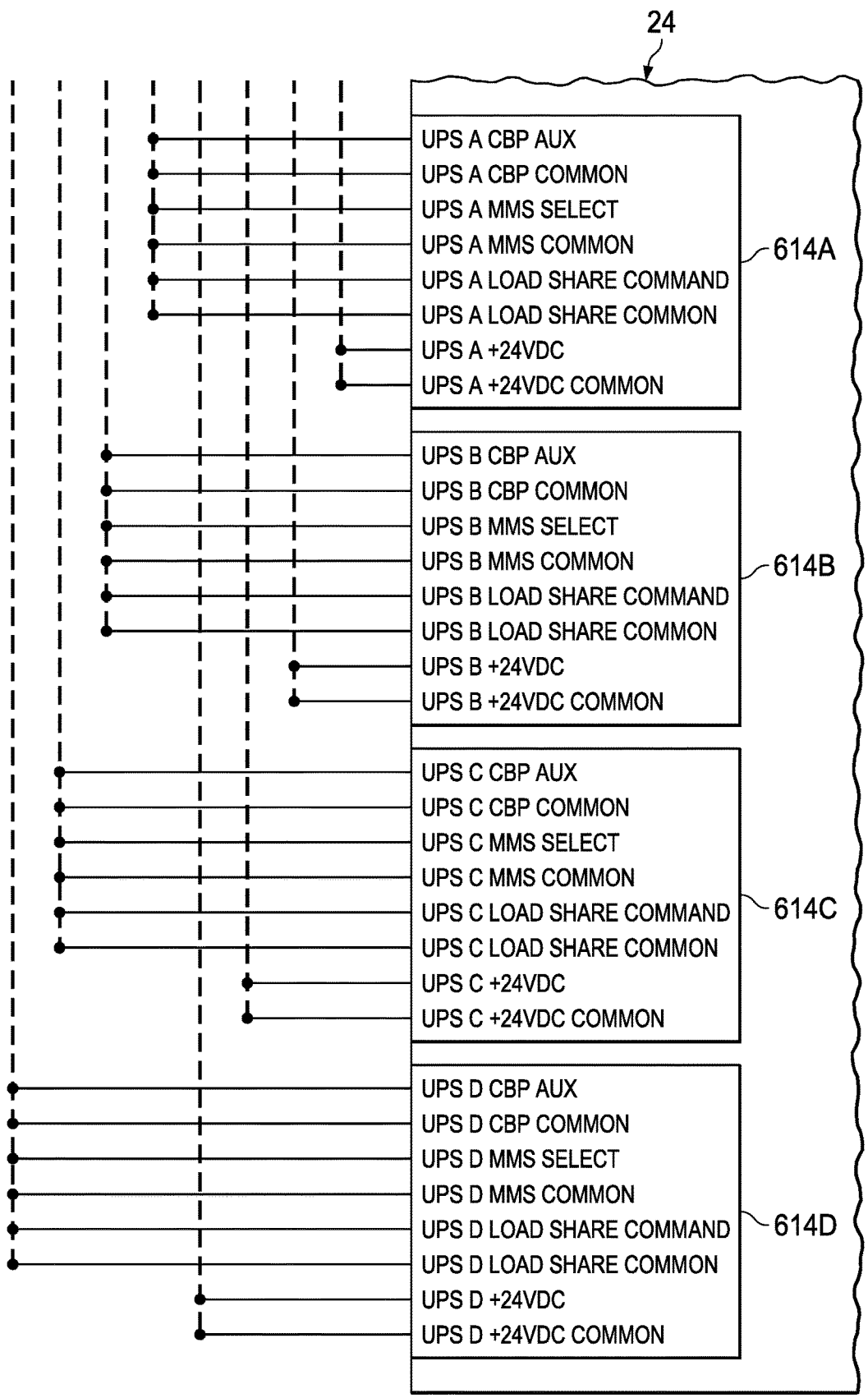
FIG. 12 is another portion of a circuit diagram illustrating more specific components of the board signals of FIG. 7, in accordance with an embodiment of the present disclosure.

The MMS control circuit 24 may utilize the signals 612 received from the PLC 26, signals 310 received from the HCTs 36, and signals 420 received from the sync relays 218 to determine commands 614 for outputting to the various UPSs 12 coupled thereto, in accordance with the description provided above regarding the MMS control circuit 24 of FIGS. 3, 4A, 4B, 5, and 6. These commands 614 may include the UPS "N" MMS Command to UPS "N" output, the UPS "N" Load Share Command to UPS "N", and the UPS "N" CBP Aux output to UPS "N" as described above and also shown in the example circuitry diagram of FIG. 12. FIG. 12 shows these commands 614A, 614B, 614C, and 614D that may be provided from the MMS control circuit 24 to each of the connected UPS modules 12A, 12B, 12C, and 12D, respectively.

The PLC 26 may also send operating commands 620 to the UPS modules 12, these operating commands 620 regarding the type of power (e.g., battery, generator) the UPS module 12 is on or whether the UPS module 12 is being bypassed in response to an unexpected failure or the UPS module 12 being taken offline for maintenance.

FIG. 7 also shows the circuit breakers 34A and 34B within the two ADUs 16A and 16B, respectively. These circuit breakers 34A and 34B operate in response to the commands 611 received from the PLC 26. Examples of the commands 611 that may be communicated from the PLC 26 to the circuit breakers 34A and 34B are provided in FIG. 8. The command signals 611 may command the circuit breakers 34A and 34B to open or close various switches 616 in the ADUs 16A and 16B so as to provide electrical communication via one or more of the CBM pathways 20A and 20B and/or the CBP pathway 22A (as illustrated in detail in FIGS. 9A and 9B). The switches 616 may include, for example, a switch 616A along the CBM pathway 20A through the ADU 16A, a switch 616B along the CBP pathway 22A through ADU 16A, a switch 616C along the CBM pathway 20B through the ADU 16B, and a switch 616D along the CBP pathway 22B through ADU 16B. In this way, the PLC 26 may output the commands 611 to operate the circuit breaker equipment 34 associated with each of the ADUs 16 through which the UPS modules 12 are selectively connected and/or disconnected from data center loads 14.

Figure 14:
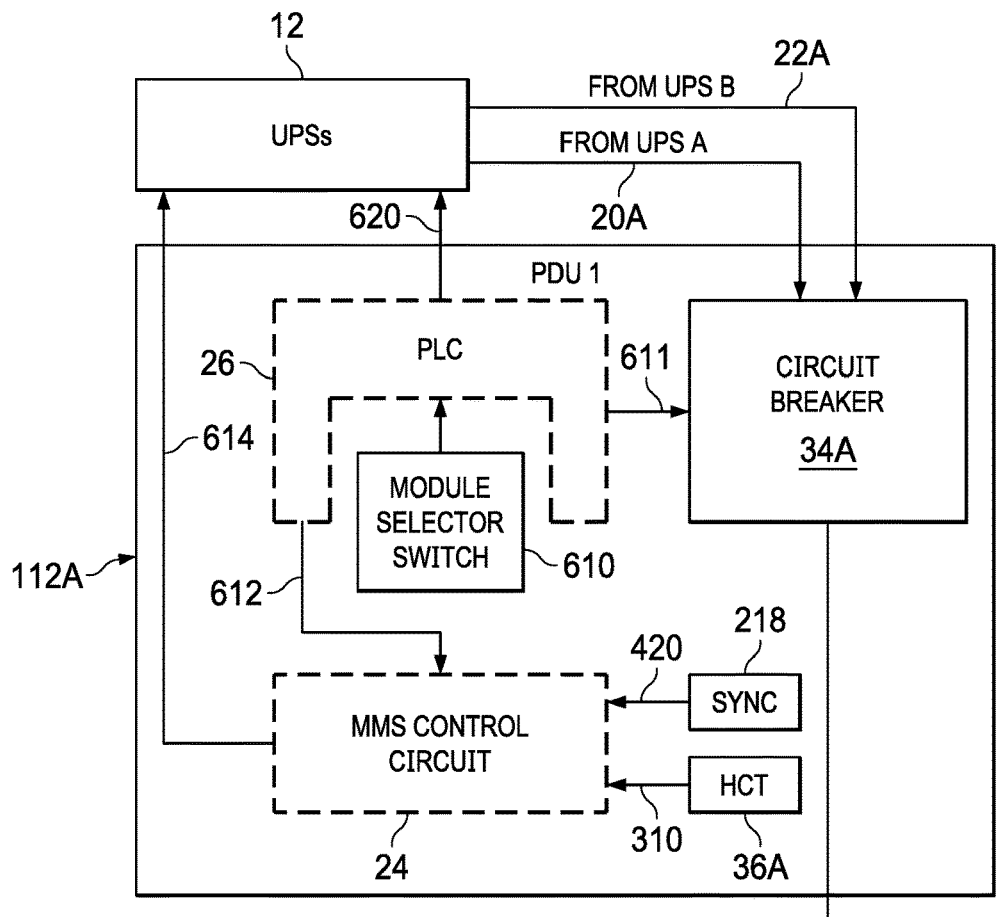
FIG. 14 is a schematic block diagram illustrating board signals for the active MMS system of FIG. 2, in accordance with an embodiment of the present disclosure.

FIG. 14 is a schematic block diagram illustrating various circuitry and other components that make up the disclosed MMS UPS system 10 of FIGS. 2A and 2B (having dual-input PDUs 112). The block diagram shows the PLC 26, MMS control circuit 24, UPS modules 12, a single load 110 (e.g., 110A), and a dual-input PDU 112 (PDU 1) with associated circuitry that may be used in the disclosed active MMS system. Although the block diagram is shown in the context of a single PDU 112A, it should be noted that similar inputs and outputs are communicated between the PLC 26, MMS control circuit 24, and the circuitry within the other dual-input PDUs 112 of the system (e.g., PDUs 112B-112F of FIGS. 2A and 2B). The block diagram of FIG. 14 is merely simplified for ease of discussion, although lines used to connect the PLC 26 and MMS control circuit 24 to other PDUs 112 are illustrated in the example circuitry diagrams of FIGS. 12, 15, 16, 17A, 17B, 18, 19A, and 19B.

As shown in FIG. 14, the PLC 26 is in communication with the MMS control circuit 24. The PLC 26 may be coupled to a module selector switch 610 that signals the PLC 26 regarding which UPS modules 12 are to be connected to the various loads 110. This determination may be made via the latch circuit of the MMS control circuit 24, which is described above. Upon receiving signals from the module selector switch 610, the PLC 26 may output desired command signals 611 to the circuit breaker 34A of the PDU 112A. The PLC 26 may communicate input signals 612 indicative of the HCT/Aux Fault condition 414, UPS status 416, and UPS Pre MMS condition 510 of each connected UPS module to the MMS control circuit 24. A more detailed example of the signals 612 communicated between the PLC 26 and the MMS control circuit 24 is provided in FIGS. 19A and 19B, along with a view of the options for the module selector switch 610. The MMS control circuit 24 may also receive current input signals 310 from the sensors components (e.g., HCTs) 36 located in each of the PDUs 112 (shown in more detail in FIGS. 17A, 17B, and 18), and sync input signals 420 from the synchronizing relay 218 in the PDU 112 (shown in more detail in FIGS. 16 and 18).

The MMS control circuit 24 may utilize the signals 612 received from the PLC 26, signals 310 received from the HCTs 36, and signals 420 received from the sync relays 218 to determine commands 614 for outputting to the various UPSs 12 coupled thereto, in accordance with the description provided above regarding the MMS control circuit 24 of FIGS. 3, 4A, 4B, 5, and 6. These commands 614 may include the UPS "N" MMS Command to UPS "N" output, the UPS "N" Load Share Command to UPS "N", and the UPS "N" CBP Aux output to UPS "N" as described above and also shown in the example circuitry diagram of FIG. 12. FIG. 12 shows these commands 614A, 614B, 614C, and 614D that may be provided from the MMS control circuit 24 to each of the connected UPS modules 12A, 12B, 12C, and 12D, respectively.

The PLC 26 may also send operating commands 620 to the UPS modules 12, these operating commands 620 regarding the type of power (e.g., battery, generator) the UPS module 12 is on or whether the UPS module 12 is being bypassed in response to an unexpected failure or the UPS module 12 being taken offline for maintenance.

FIG. 14 also shows the circuit breaker 34A within the PDU 16A. This circuit breaker 34A (along with those breakers in other PDUs 112) operates in response to the commands 611 received from the PLC 26. Examples of the commands 611 that may be communicated from the PLC 26 to the circuit breakers 34 are provided in FIG. 15. The command signals 611 may command the circuit breaker 34 to open or close various switches 616 in the PDU 112 so as to provide electrical communication via one or more of the CBM pathway 20A and the CBP pathway 22A (as illustrated in detail in FIG. 16). The switches 616 may include, for example, a switch 616A along the CBM pathway 20A through the PDU 112 and a switch 616B along the CBP pathway 22A through the PDU 112. In this way, the PLC 26 may output the commands 611 to operate the circuit breaker equipment 34 associated with each of the PDUs 16 through which the UPS modules 12 are selectively connected and/or disconnected from data center loads 110.

Turning back to FIGS. 1A-1D and 2A-2B, the load sharing mode may be used when both UPS modules 12 associated with a given load 14, 110 are connected to the load 14, 110 via their associated ADUs 16 or PDUs 112 (e.g., via on-board circuit breakers 34). In the load sharing mode, both UPS modules 12 may supply a portion of the electrical power needed to support a given load 14, 110. The individual power mode may be used when a UPS module 12 is connected to its associated load 14, 110 but the other UPS module 12 associated with the load 14, 110 is not supporting the load 14, 110. This is the case, for example, when the other UPS module 12 has been taken offline for maintenance/repairs. Instead of supplying a portion of the power to support the load 14, in the individual power mode the remaining UPS module 12 is controlled to supply all the full power for supporting the load 14, 110. For example, when maintenance or repairs are required on one of the UPS modules 12, the active MMS system 10 may disconnect the particular UPS module 12 from its various loads 14, 110. Simultaneously, the MMS system 10 may detect the single-module condition of these loads 14 via the sensing components 36 on the ADUs/PDUs (and/or sensing components on the UPS modules 12) coupled to the PLC 26 and control circuit 24. The MMS control circuit 24 may then generate control signals to command the remaining UPS modules 12 that are connected to the associated loads 14, 110 to operate individually and stop the load sharing operation.

A more detailed description of this transition from load sharing mode to individual operation mode will now be provided. This description is an example of how to control the MMS UPS system 10 to remove the first UPS module 12A from the distributed redundant ADU system 10 shown in FIGS. 1A-1D. It will be understood, however, that similar commands may be issued to remove a UPS module from the dual-input PDU based system of FIGS. 2A-2B.

Figure 13A:
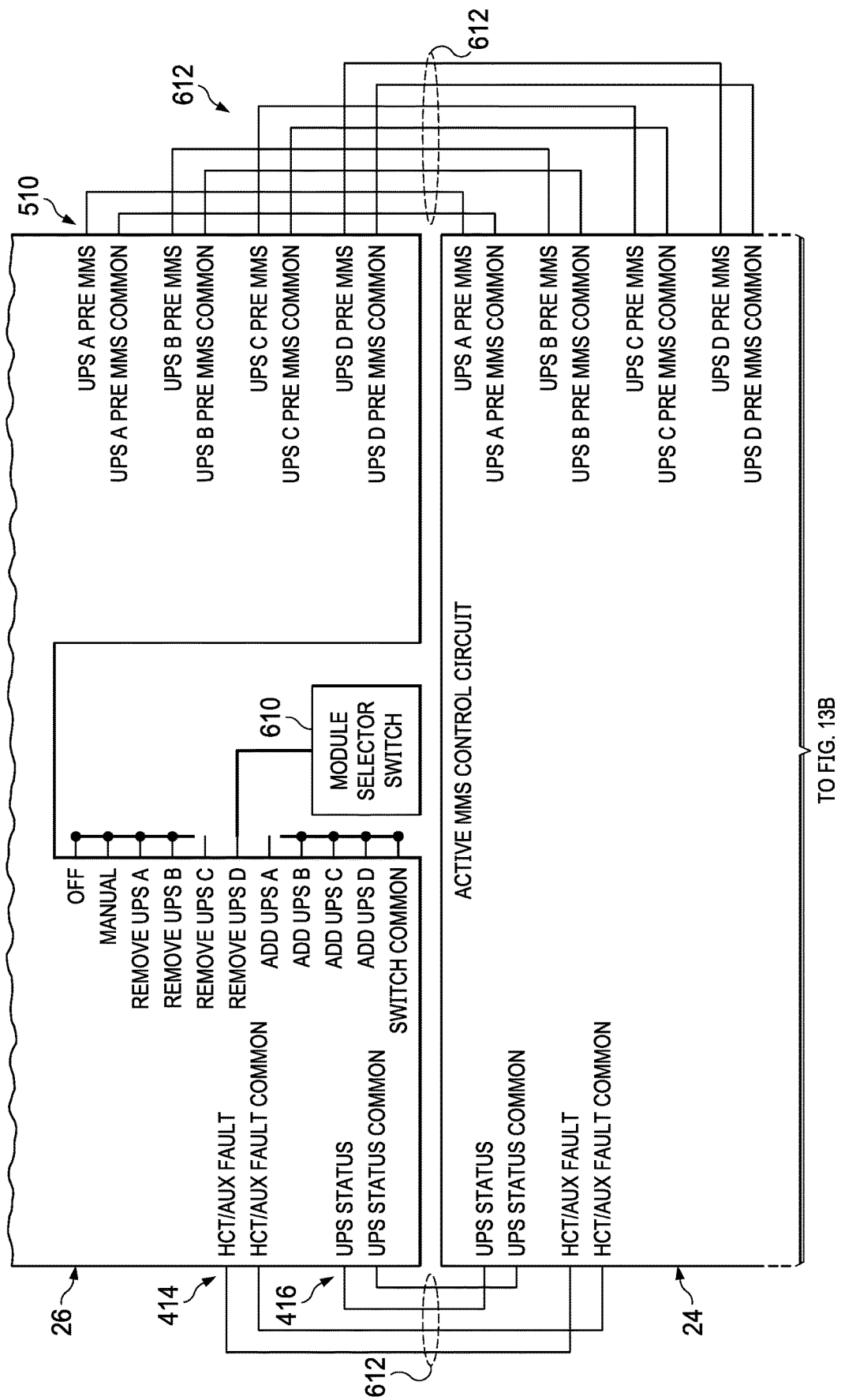
FIGS. 13A and 13B illustrate another portion of a circuit diagram showing more specific components of the board signals of FIG. 7, in accordance with an embodiment of the present disclosure.
Figure 13B:
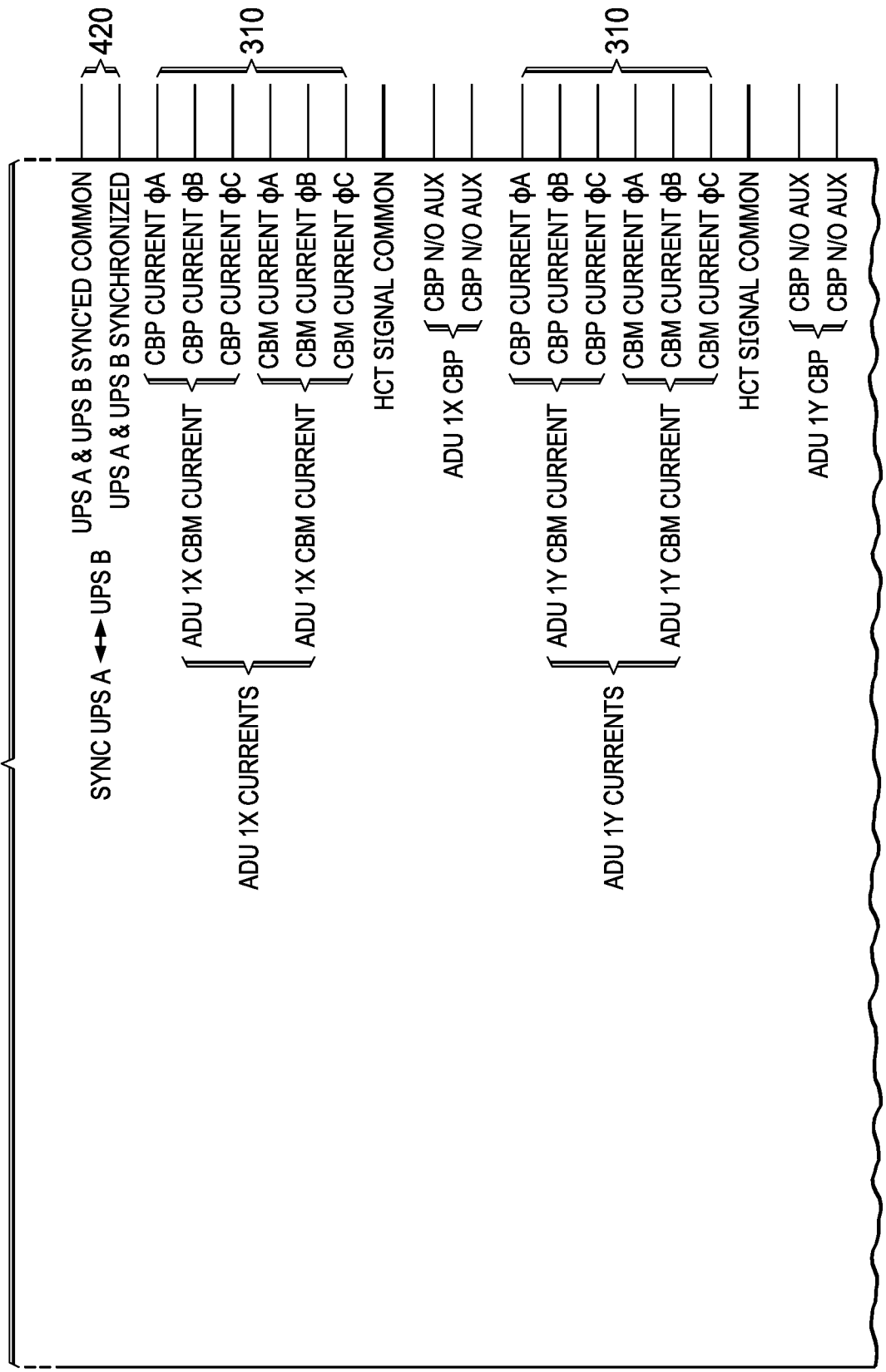
Figure 15:
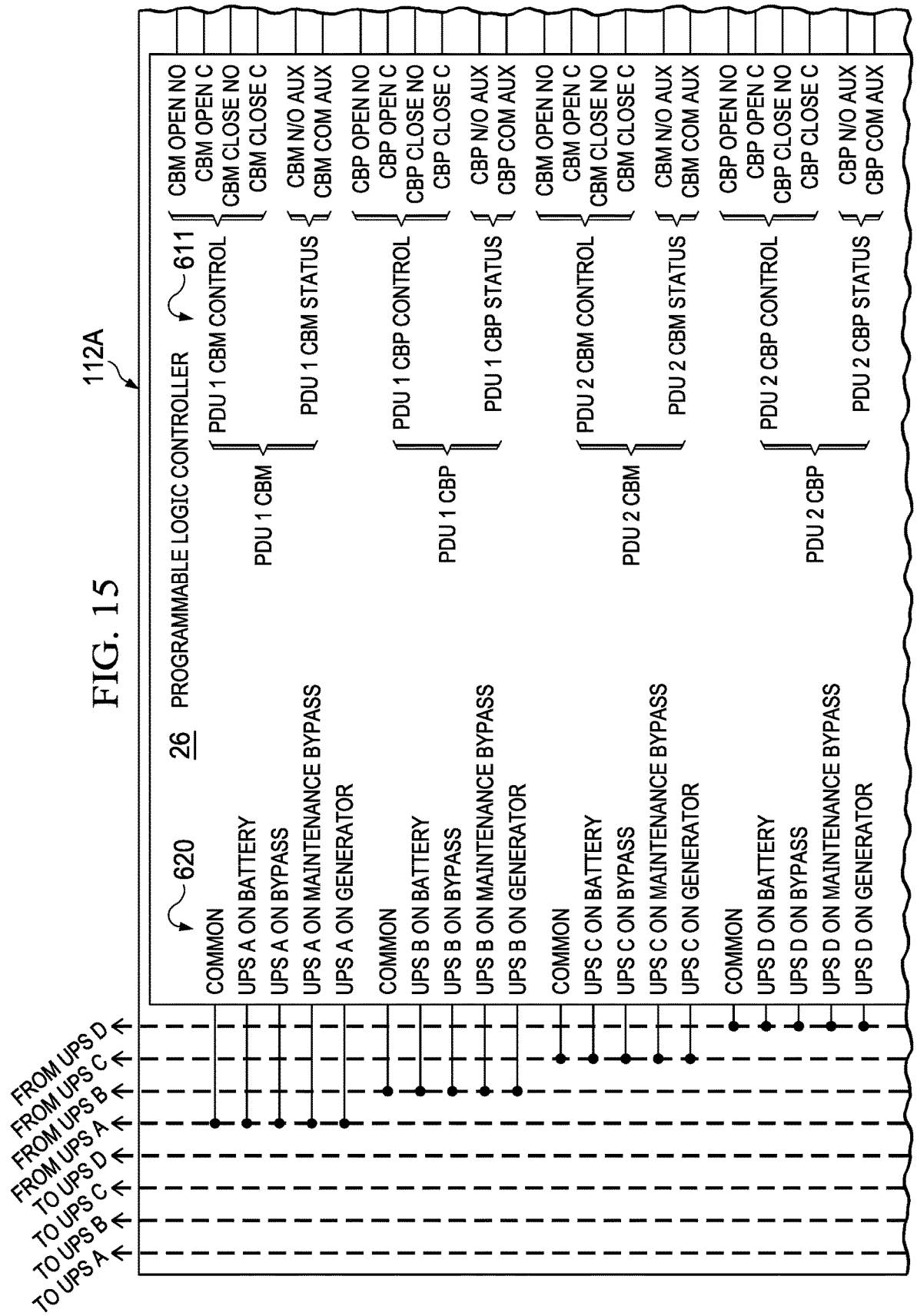
FIG. 15 is a portion of a schematic circuit diagram illustrating more specific components of the board signals of FIG. 14, in accordance with an embodiment of the present disclosure.
Figure 16:
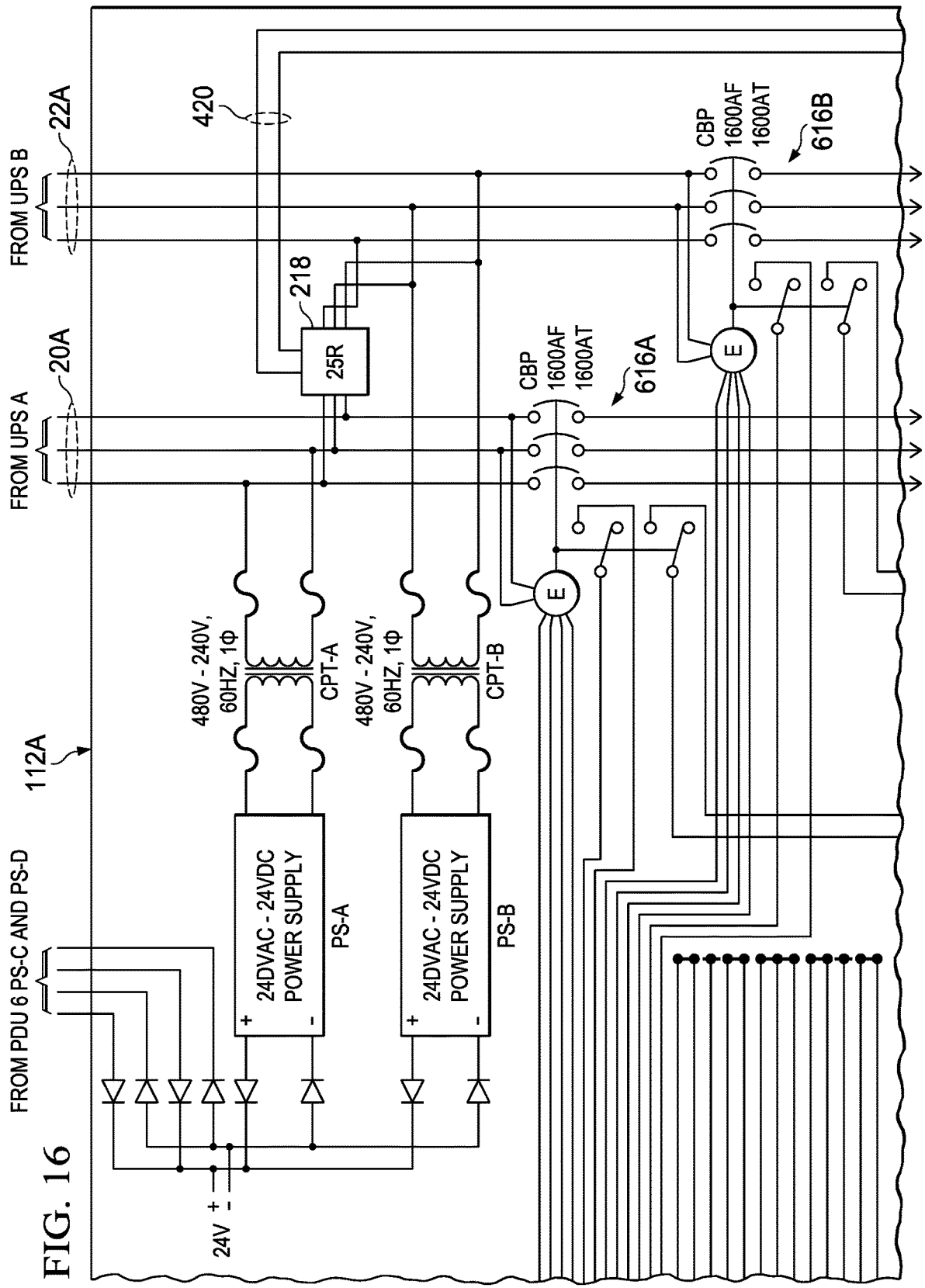
FIG. 16 is another portion of the circuit diagram illustrating more specific components of the board signals of FIG. 14, in accordance with an embodiment of the present disclosure.
Figure 17A:
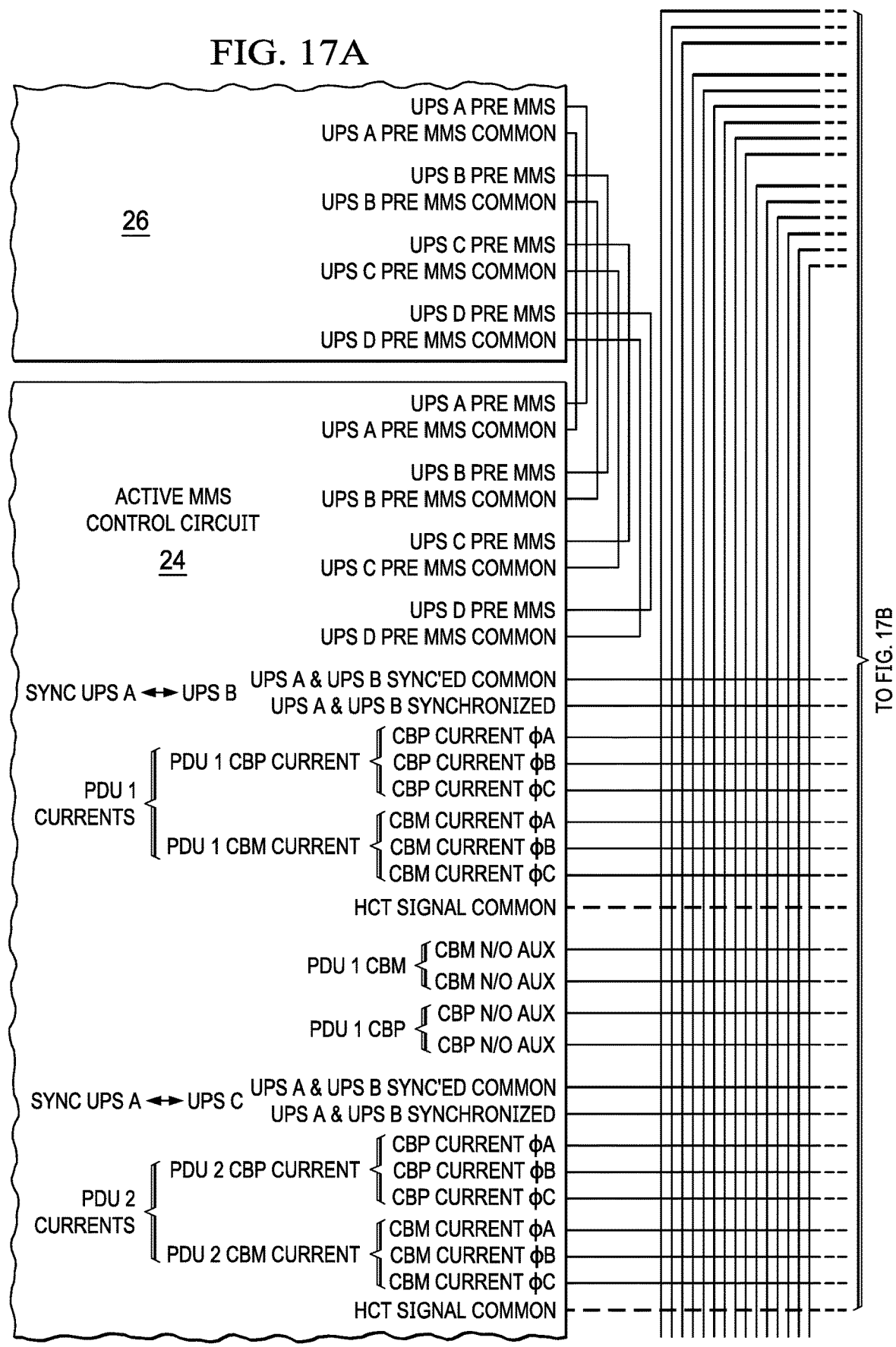
FIGS. 17A and 17B illustrate another portion of the circuit diagram showing more specific components of the board signals of FIG. 14, in accordance with an embodiment of the present disclosure.
Figure 17B:
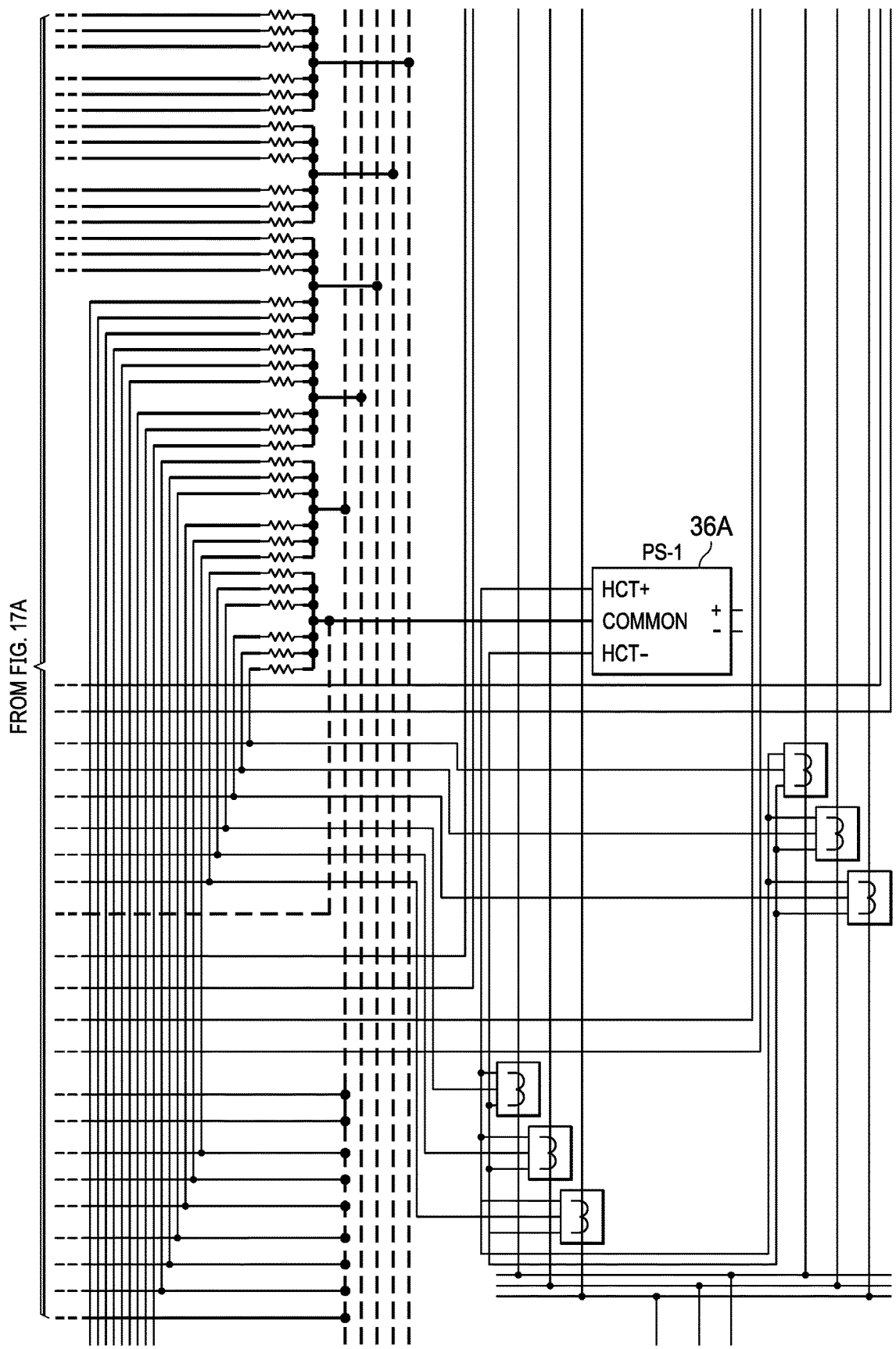
Figure 18:
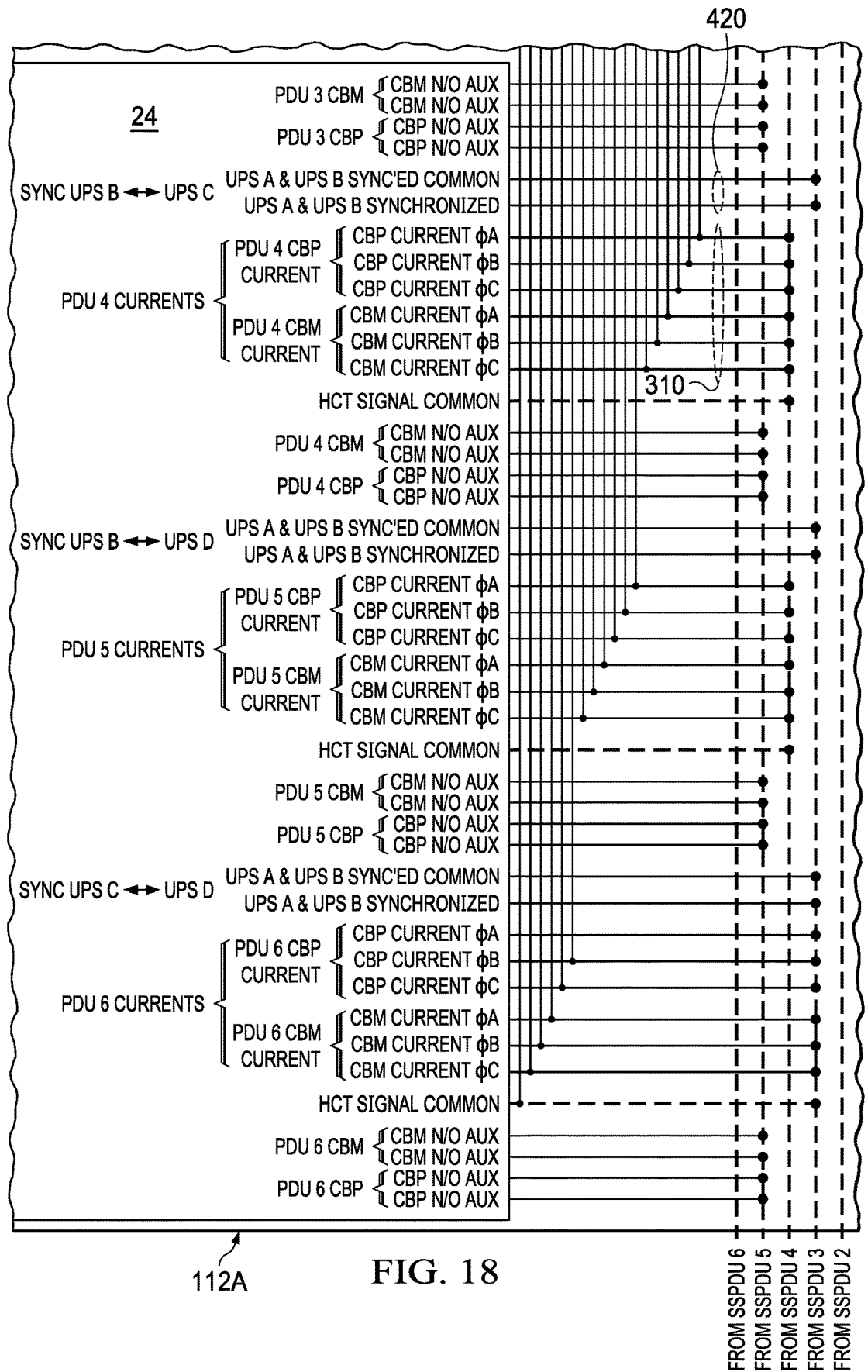
FIG. 18 is another portion of the circuit diagram illustrating more specific components of the board signals of FIG. 14, in accordance with an embodiment of the present disclosure.
Figure 19A:
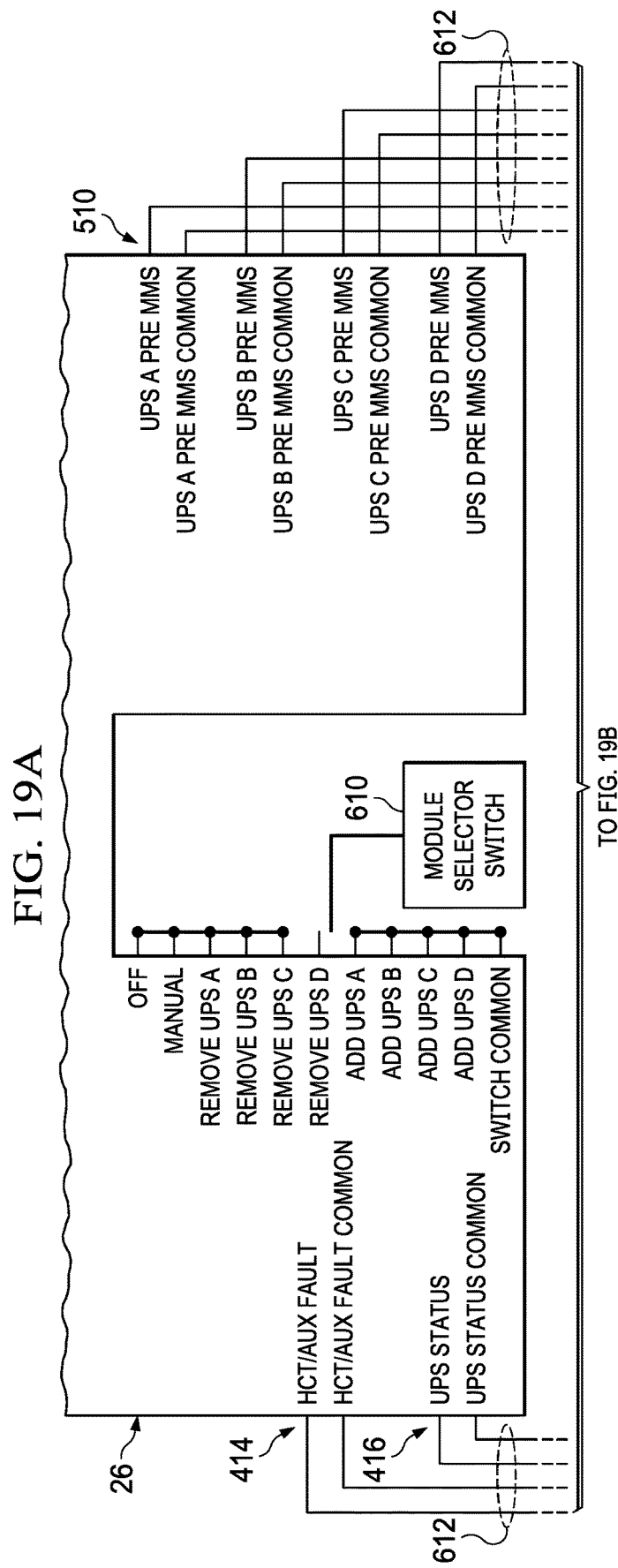
FIGS. 19A and 19B illustrate another portion of the circuit diagram showing more specific components of the board signals of FIG. 14, in accordance with an embodiment of the present disclosure.
Figure 19B:
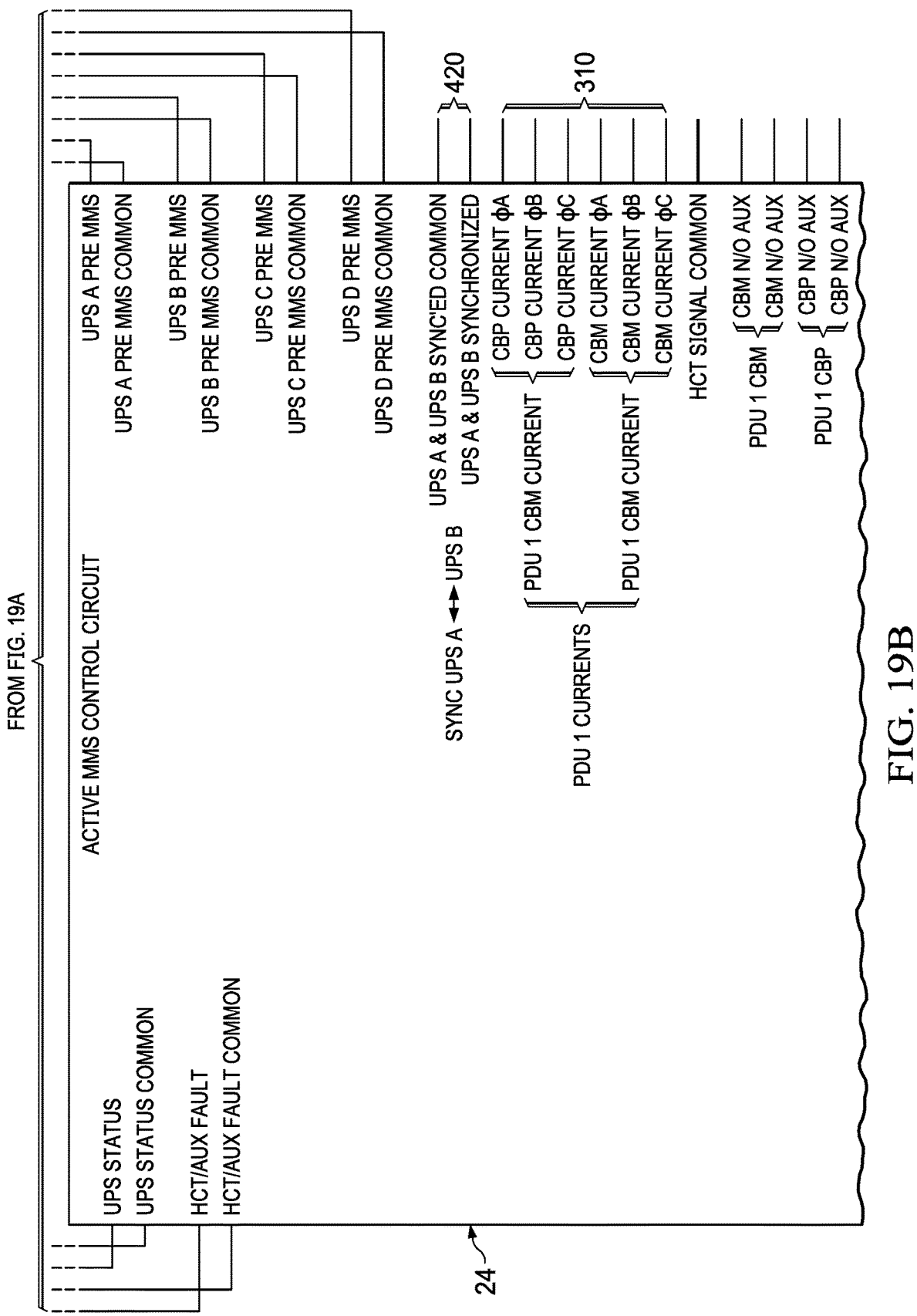

This process may begin upon the module selector switch 610 being placed in the "Remove A" position (FIGS. 13A-13B). First, the MMS control circuit 24 outputs signals to place the load (i.e., 14A) from the UPS module 12A onto the UPS module 12B. This involves closing, via the PLC 26, the "UPS A Pre MMS" and "UPS B Pre MMS" outputs 510 to the MMS control circuit 24 (FIGS. 13A-13B). Then the PLC 26 starts a timer, during which the MMS control circuit 24 closes the "UPS A MMS Select" and "UPS B MMS Select" outputs (FIG. 12) to the UPS modules 12A and 12B. As a result, the UPS modules 12A and 12B switch to operating in the "Pre-MMS without Load Share" mode. At this point, the UPS modules 12A and 12B are being operated in preparation for their outputs to be paralleled for load sharing. The UPS module 12A is supplying power to a first cord of the dual-cord load 14A while the UPS module 12B is supplying power to a second cord of the dual-cord load 14A.

Figure 9A:
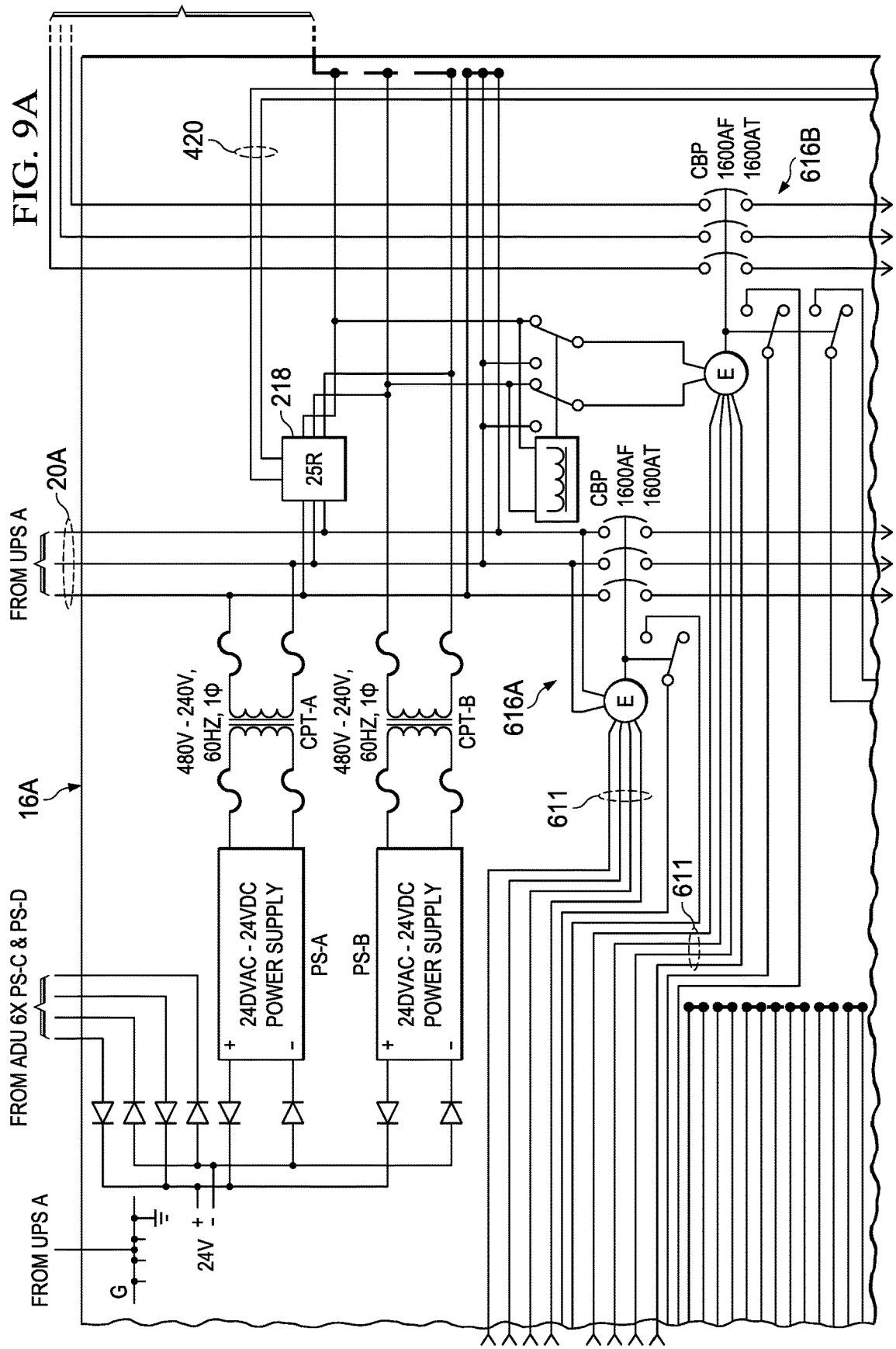
FIGS. 9A and 9B illustrate another portion of the circuit diagram showing more specific components of the board signals of FIG. 7, in accordance with an embodiment of the present disclosure.
Figure 9B:
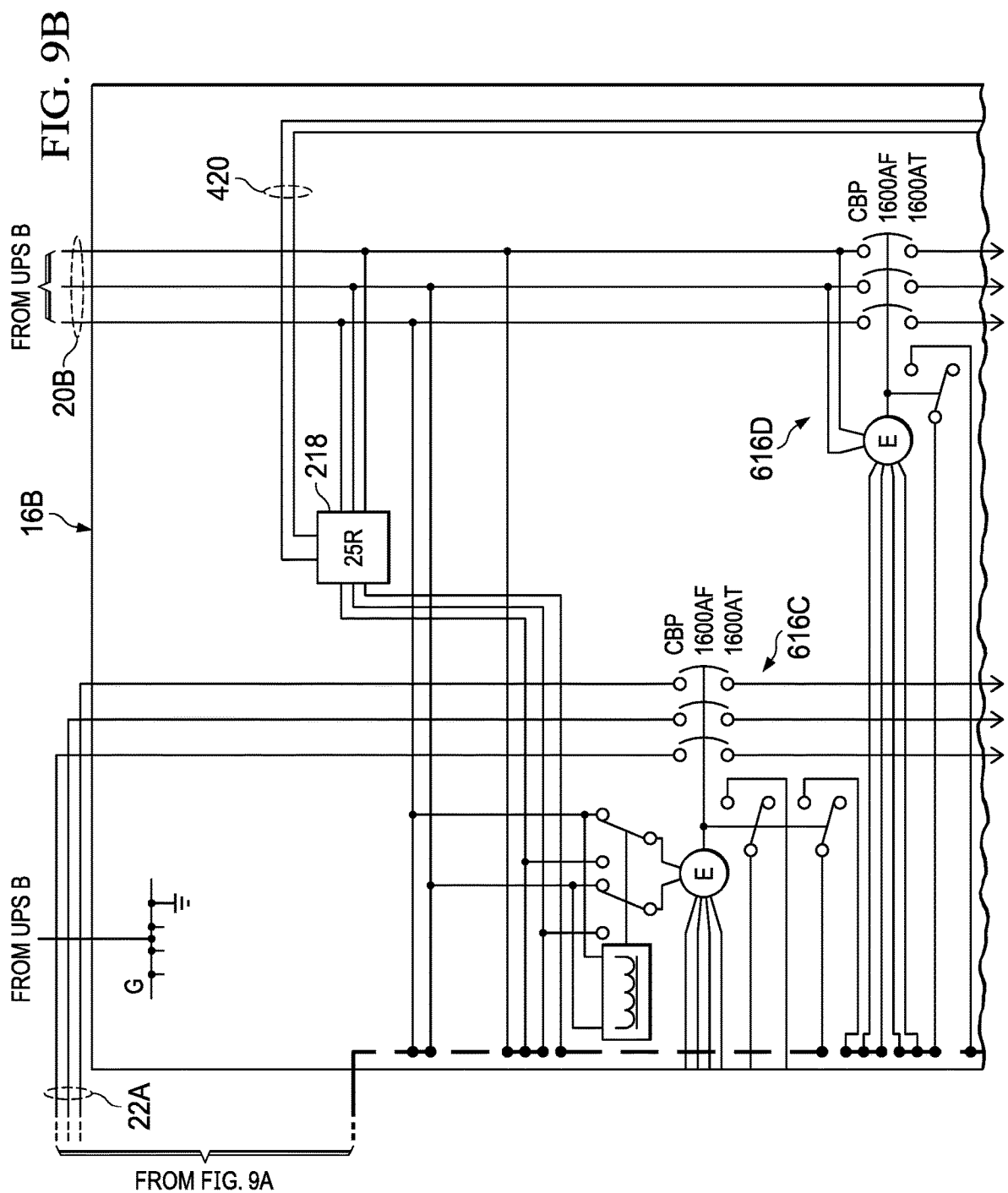
Figure 10D:
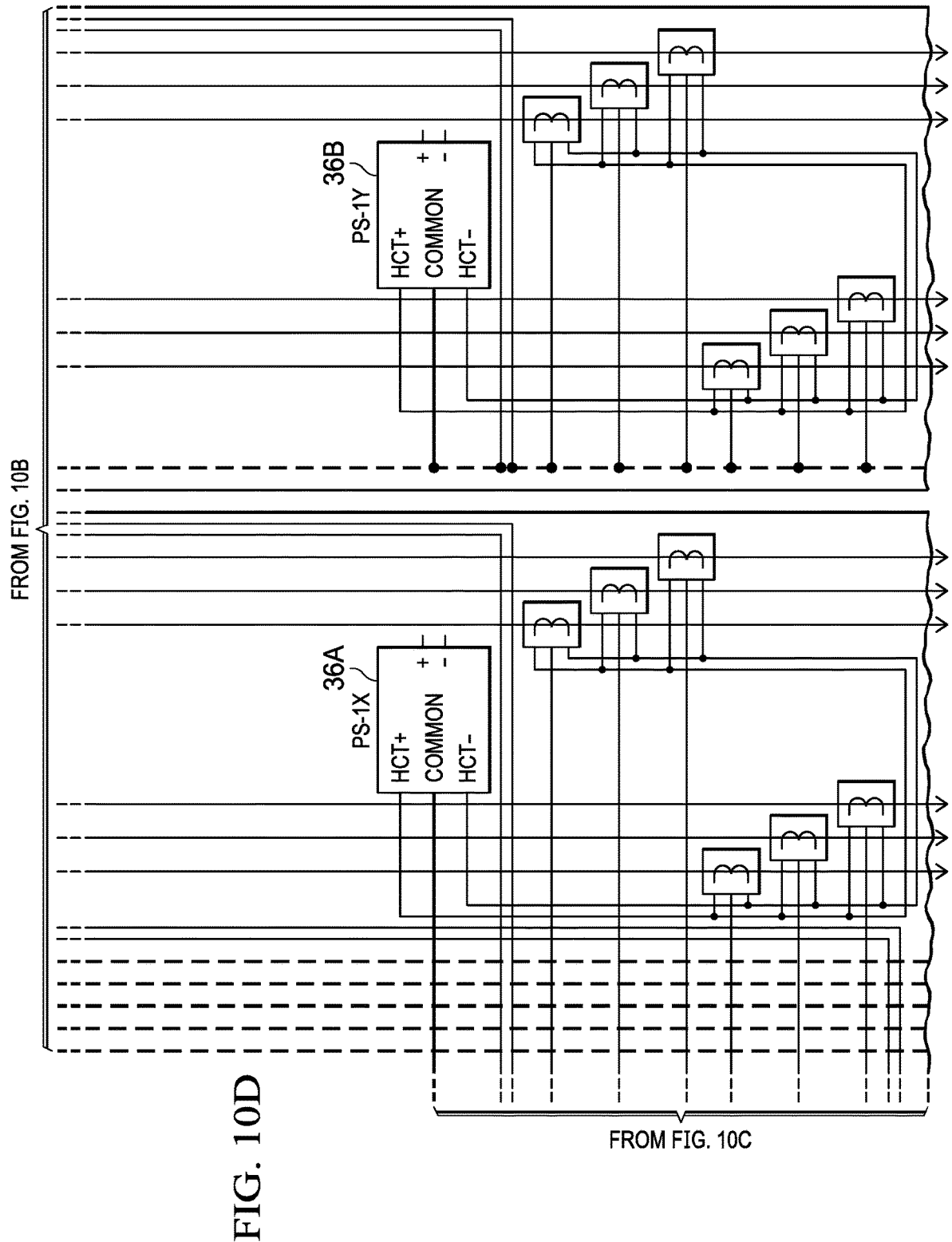
Figure 11:
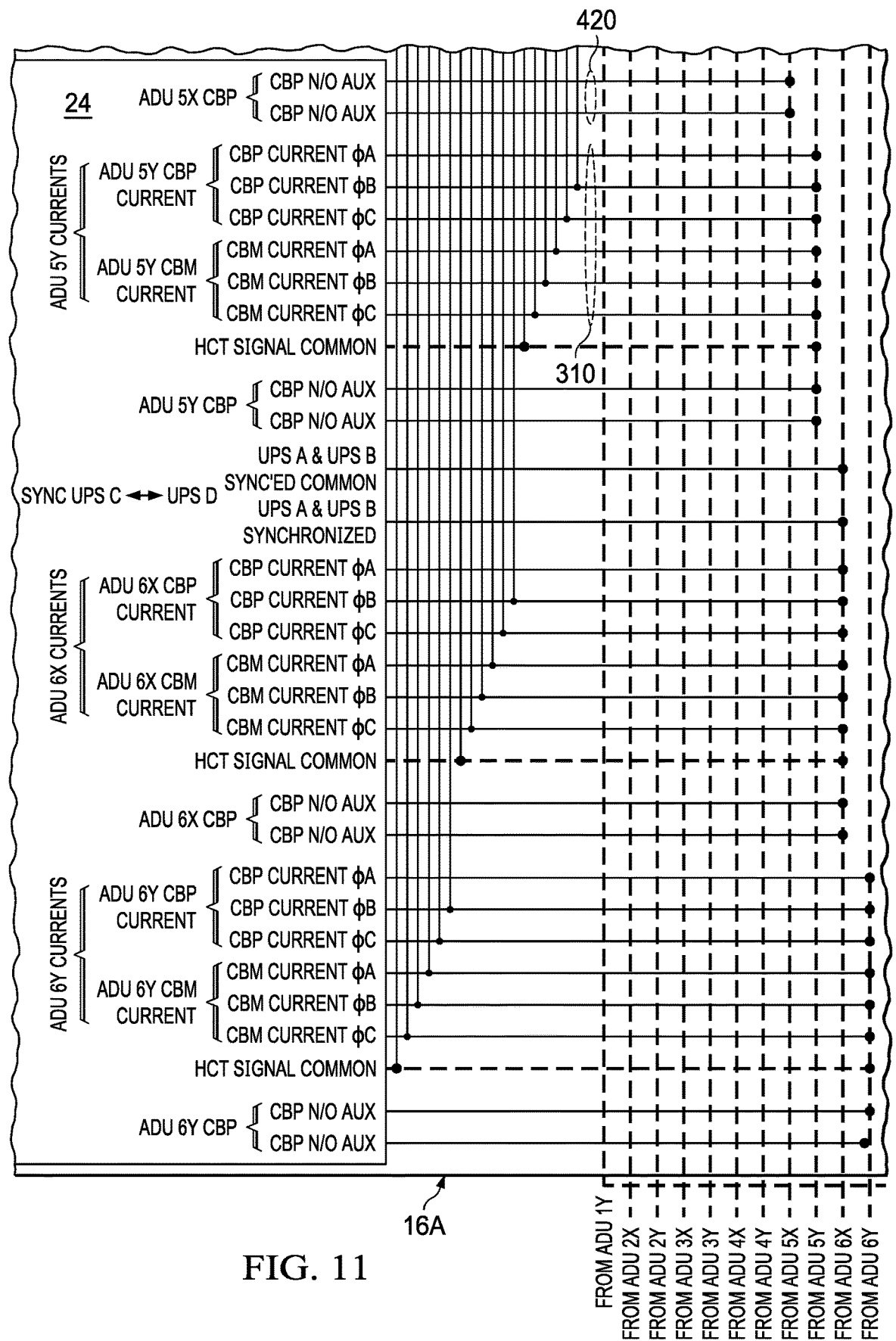
FIG. 11 is another portion of a circuit diagram illustrating more specific components of the board signals of FIG. 7, in accordance with an embodiment of the present disclosure.

The PLC 26 then activates the ADU 1X CBP "close" output to the circuit breaker 34A, thereby closing the switch 616B shown in FIGS. 9A and 9B. The PLC 26 also activates the ADU 1Y CBP "close" output to the circuit breaker 34B, thereby closing the switch 616D shown in FIGS. 9A and 9B. This allows current to flow through the CBP pathway 22A, the current increasing from 0.0 AAC to a minimum of 10% of nominal current. The HCTs 36A and 36B detect this current, and as a result the MMS control circuit 24 sets the corresponding "HCT/Aux Fault" to true. The MMS control circuit 24 notifies the PLC 26 of this condition so that the PLC 26 starts a timer to ignore the "Fault" signal. With less than or equal to a 20 microsecond delay, the MMS control circuit 24 processes this "HCT/Aux Fault" signal as described above (with reference to FIGS. 3, 4A, 4B, 5, and 6) to close both the "UPS A Load Share Command" output to the first UPS module 12A and the "UPS B Load Share Command" output (FIG. 12) to the second UPS module 12B. As a result, the UPS modules 12A and 12B switch to operating in the "MMS with Load Share" mode. At this point, the UPS modules 12A and 12B are sharing the load via a paralleled connection. As a result, both UPS modules 12A and 12B are supplying power via a paralleled connection to both cords of the dual-cord load 14A.

The MMS control circuit 24 will then, with less than or equal to a 20 microsecond delay, close the "UPS A CBP Command" output to the UPS module 12A and close the "UPS B CBP Command" output to the UPS module 12B. The PLC 26 may then activate the ADU 1X CBM "Open" output to the circuit breaker 34A, thereby opening the switch 616A shown in FIGS. 9A and 9B. This prevents current flowing through the CBM pathway 20A, the current decreasing from a minimum of 10% nominal current to 0.0 AAC. Thus the UPS module 12A is no longer able to output electrical signals to the ADU 16A and load 14A. The HCT 36A detects this change in current, and as a result the MMS control circuit 24 sets the corresponding "HCT/Aux Fault" to true. The MMS control circuit 24 notifies the PLC 26 of this condition so that the PLC 26 starts a timer to ignore the "Fault" signal. With less than or equal to a 20 microsecond delay, the MMS control circuit 24 opens the "UPS A Load Share Command" output to UPS module 12A, opens the "UPS B Load Share Command" output to UPS module 12B, opens the "UPS A CBP Command" output to UPS module 12A, and opens the "UPS B CBP Command" output to UPS module 12B (FIG. 12). The PLC 26 then opens the "UPS A Pre MMS" output to the MMS control circuit 24 and opens the "UPS B Pre MMS" output to the MMS control circuit 24 (FIGS. 13A and 13B). The PLC 26 starts a timer, during which the MMS control circuit 24 opens the "UPS A MMS Select Command" output to the UPS module 12A.

The system then repeats a similar process whereby the MMS control circuit 24 outputs signals to place the load (i.e., 14B) from the UPS module 12A onto the UPS module 12C. Similar to the method outlined above, this involves the system closing the switches that allow current to flow through the CBP pathway 22B between the ADUs 2X and 2Y, and adjusting the operation of the associated UPS modules 12A and 12C to share the load 14B via paralleled connection. The system then opens the switch that allows current to flow through the CBM pathway 20C between the UPS module 12 and the ADU 2X, and the operation of the associated UPS modules 12A and 12C is adjusted so that just the UPS module 12C supplies power to the entire load 14B.

The system repeats a similar process again whereby the MMS control circuit 24 outputs signals to place the load (i.e., 14C) from the UPS module 12A onto the UPS module 12D. Similar to the methods outlined above, this involves the system closing the switches that allow current to flow through the CBP pathway 22C between the ADUs 3X and 3Y, and adjusting the operation of the associated UPS modules 12A and 12D to share the load 14C via paralleled connection. The system then opens the switch that allows current to flow through the CBM pathway 20E between the UPS module 12A and the ADU 3X, and the operation of the associated UPS modules 12A and 12D is adjusted so that just the UPS module 12D supplies power to the entire load 14C. Once this process is complete, the UPS module 12A will be entirely removed from operation in the system, and maintenance can be performed on the UPS module 12A.

After the maintenance/repair is completed, the offline UPS module 12 may be reconnected to its associated loads 14, at which point the ADU/PDU sensors 36 and/or other sensors will determine that the UPS module 12 is reconnected, and the control circuit 24 will command the UPS modules 12 to return to operating in the load sharing mode. This reconnecting process is similar to the disconnection process described above, but with the switching taking place in reverse. That is, the MMS control circuit 24 and PLC 26 will operate to first place the loads (i.e., 14A, 14B, and 14C) from the UPS modules 12B, 12C, and 12D back onto the UPS module 12A.

The disclosed active MMS system 10 operates to control the switching components on each of the ADUs/PDUs as well as to selectively connect/disconnect individual UPS modules 12 from MMS operation. This allows for disconnection of a UPS module 12 from the critical load bus whenever maintenance on the UPS module 12 is required. The disclosed active MMS system 10 may therefore provide large data center customers with a Tier-III reliability level power solution at significant cost savings compared to existing 2N redundancy UPS designs due to the reduced complexity of the system and reduction of space taken up by the system.

Although the disclosure and its advantages have been described in detail, it should be understood that various changes, substitutions and alterations can be made herein without departing from the spirit and scope of the disclosure as defined by the following claims.

What is claimed is:
1. A system, comprising:
an uninterruptible power supply (UPS) system comprising two UPS modules;

a load associated with the UPS system;
at least one power distribution unit (PDU) electrically coupled between the first and second UPS modules and the load, wherein the at least one PDU comprises a circuit breaker for selectively transitioning between electrically coupling one of the UPS modules to the load individually and electrically coupling the two UPS modules to the load in parallel;
sensor components disposed in the at least one PDU to detect current in electrical pathways between the UPS modules and the load;
a controller communicatively coupled to the at least one PDU, wherein the controller controls positions of the circuit breaker; and
a multi-module switching (MMS) control circuit communicatively coupled to the controller, the sensor components, and the UPS modules, wherein the MMS control circuit is configured to:
  receive sensor signals from the sensor components indicative of whether the UPS modules are electrically connected to the load; and
  based on the sensor signals, output control signals to the UPS modules to operate each of the UPS modules in either an individual mode or a load sharing mode.

2. The system of claim 1, wherein the load is a dual-cord load, wherein the at least one PDU comprises two distributed redundant automatic distribution units (ADUs) each coupled to one cord of the dual-cord load.

3. The system of claim 2, wherein the electrical pathways comprise:
a first pathway through the first ADU coupling the first UPS module to a first cord of the load;
a second pathway through the second ADU coupling the second UPS module to a second cord of the load; and
a third pathway coupling the first ADU to the second ADU, wherein the third pathway is coupled in parallel to the first pathway in the first ADU and coupled in parallel to the second pathway in the second ADU.

4. The system of claim 1, wherein the load comprises a single cord load, wherein the at least one PDU comprises a single PDU having two inputs and coupled to the load.

5. The system of claim 4, wherein the electrical pathways comprise a first pathway through the PDU and a second pathway through the PDU, the first and second pathways being coupled in parallel in the PDU and output to the single cord load.

6. The system of claim 1, wherein the MMS control circuit comprises a latch circuit configured to latch upon receiving sensor signals indicating that the UPS modules are electrically connected in parallel to the load.

7. The system of claim 6, wherein the latch circuit is communicatively coupled to synchronization relays in the at least one PDU, the controller, and an on-board self-test circuit disposed on the MMS control circuit, wherein the latch circuit is configured to latch upon receiving signals indicating:
1) the UPS modules are connected in parallel, based on inputs from the sensor components;
2) current flow through different electrical pathways between the UPS modules and the load is synchronized, based on inputs from the synchronization relays;
3) one of the sensor components is reading a non-zero output while an Aux contact associated with the sensor component is open, or one of the sensor components is reading a zero output while an Aux contact associated with the sensor component is closed, based on inputs from the controller;
4) an on-board power supply of the MMS control circuit is operable, based on an input from the on-board self-test circuit; and
5) all UPS modules are in a proper mode of operation, based on inputs from the controller.

8. The system of claim 6, wherein the MMS control circuit comprises a UPS isolation circuit communicatively coupled to the latch circuit, wherein latch circuit outputs a signal indicative of a latched paralleled condition to the UPS isolation circuit when latched.

9. The system of claim 8, wherein the UPS isolation circuit is communicatively coupled to the controller, the at least one PDU, and the UPS modules, wherein the UPS isolation circuit is configured to output the control signals to the UPS modules upon receiving at least one of:
the signal indicative of the latched parallel condition from the latch circuit;
a signal indicative of a contact closure based on maintenance switch position and external control circuitry sequencing; or
a redundant indication of circuit breaker closure indicating paralleled UPS modules.

10. The system of claim 1, wherein the UPS system comprises a plurality of UPS modules arranged with N+1 redundancy and a plurality of associated loads.

11. A method, comprising:
controlling positions of a circuit breaker disposed in at least one power distribution unit (PDU) via a controller, wherein the at least one PDU is coupled between two uninterruptible power supply (UPS) modules and a load;
transitioning the at least one PDU from a configuration where one of the two UPS modules is coupled individually to the load to a configuration where the two UPS modules are coupled in parallel to the load via the circuit breaker;
detecting a change in coupling of the UPS modules to the load via sensor components;
determining control signals to output to the UPS modules via a multi-module switching (MMS) control circuit communicatively coupled to the sensor components based on the detected change; and
operating the UPS modules based on the control signals output from the MMS control circuit.

12. The method of claim 11, further comprising detecting a paralleled condition of the UPS modules indicating that the UPS modules are electrically connected in parallel to the load based on the detected change, and determining the control signals to output to the UPS modules based on the paralleled condition.

13. The method of claim 12, further comprising detecting the paralleled condition via a latch circuit on the MMS control circuit, wherein the latch circuit is configured to latch upon receiving signals indicating:
1) the UPS modules are connected in parallel, based on the detected change;
2) current flow through electrical pathways between the UPS modules and the load is synchronized, based on inputs from synchronization relays in the at least one PDU;
3) one of the sensor components is reading a non-zero output while an Aux contact associated with the sensor component is open, or one of the sensor components is reading a zero output while an Aux contact associated with the sensor component is closed, based on inputs from the controller;

4) an on-board power supply of the MMS control circuit is operable, based on an input from an on-board self-test circuit; and 5) all UPS modules are in a proper mode of operation, based on inputs from the controller.

14. The method of claim 12, further comprising providing the paralleled condition to a UPS isolation circuit of the MMS control circuit, and determining the control signals to output from the UPS isolation circuit based on at least one of:

the signal indicative of the paralleled condition;

a signal indicative of a contact closure based on maintenance switch position and external control circuitry sequencing; or a redundant indication of circuit breaker closure indicating paralleled UPS modules.

15. The method of claim 11, wherein the load is a dual-cord load, and wherein the at least one PDU comprises two distributed redundant automatic distribution units (ADUs) each coupled to one cord of the load;

wherein the UPS modules are coupled individually to the load when a first pathway through the first ADU is closed, a second pathway through the second ADU is closed, and a third pathway between the first and second ADUs is open; and wherein the UPS modules are coupled in parallel to the load when the third pathway between the first and second ADUs is closed.

16. The method of claim 15, wherein transitioning the ADUs from a configuration where the UPS modules are coupled individually to the load to a configuration where the UPS modules are coupled in parallel to the load comprises closing a first switch in the first ADU along the third pathway and a second switch in the second ADU along the third pathway via the circuit breaker.

17. The method of claim 16, further comprising removing the first UPS module from operation by opening a third switch in the first ADU along the first pathway via the circuit breaker.

18. The method of claim 11, wherein the load is a single cord load, and wherein the at least one PDU comprises a single PDU having two inputs and coupled to the load;

wherein the UPS modules are coupled individually to the load when a first pathway through the PDU is closed and a second pathway through the PDU is open; and wherein the UPS modules are coupled in parallel to the load when the first and second pathways are closed.

19. The method of claim 11, further comprising removing one of the UPS modules from the load, performing maintenance on the removed UPS module, and reconnecting the removed UPS module to the load.

20. The method of claim 19, wherein reconnecting the UPS module comprises:

transitioning the at least one PDU from a configuration where the remaining UPS module is coupled individually to the load to a configuration where both UPS modules are coupled in parallel to the load via the circuit breaker;

detecting a change in coupling of the UPS modules to the load via the sensor components;

determining control signals to output to the UPS modules via the MMS control circuit based on the detected change; and operating the UPS modules based on the control signals output from the MMS control circuit.

* * * * *